US011489623B2

(12) United States Patent
Gopalan et al.

(10) Patent No.: US 11,489,623 B2
(45) Date of Patent: Nov. 1, 2022

(54) ERROR CORRECTION IN NETWORK PACKETS

(71) Applicant: Aira Technologies, Inc., Saratoga, CA (US)

(72) Inventors: RaviKiran Gopalan, Cupertino, CA (US); Anand Chandrasekher, Saratoga, CA (US); Yihan Jiang, Saratoga, CA (US); Sandeep Kesireddy, San Jose, CA (US)

(73) Assignee: Aira Technologies, Inc., Saratoga, CA (US)

( * ) Notice: Subject to any disclaimer, the term of this patent is extended or adjusted under 35 U.S.C. 154(b) by 0 days.

(21) Appl. No.: 17/202,210

(22) Filed: Mar. 15, 2021

(65) Prior Publication Data
US 2022/0294557 A1  Sep. 15, 2022

(51) Int. Cl.
*H04L 1/00* (2006.01)
*H04L 1/18* (2006.01)
(Continued)

(52) U.S. Cl.
CPC .......... *H04L 1/0051* (2013.01); *H04L 1/0061* (2013.01); *H04L 1/1829* (2013.01); *G06N 3/08* (2013.01); *G06N 20/00* (2019.01)

(58) Field of Classification Search
CPC ... H04L 1/0051; H04L 1/0061; H04L 1/1829; G06N 20/00; G06N 3/08
See application file for complete search history.

(56) References Cited

U.S. PATENT DOCUMENTS 5,657,325 A   8/1997  Lou
5,910,182 A   6/1999  Dent et al.
(Continued)

FOREIGN PATENT DOCUMENTS

CN   106487610 A       3/2017
GB     2493081 A   *   1/2013   ........... H04L 1/1845

OTHER PUBLICATIONS

Martin Henze, "A Machine-Learning Packet-Classification Tool for Processing Corrupted Packets on End Hosts", Diploma Thesis, Chair of Communication and Distributed Systems, RWTH Aachen University, Mar. 2011, (Year: 2011).*
(Continued)

*Primary Examiner* — April Y Blair
*Assistant Examiner* — Rong Tang
(74) *Attorney, Agent, or Firm* — Carr & Ferrell LLP

(57) ABSTRACT

Systems and methods for error correction in network packets are provided. An example method includes receiving a network packet via a communication channel, the network packet including a content and an error-detecting code associated with the content, determining, based on the error-detecting code, that the network packet is corrupted, selecting a pre-determined number of positions of bits in the content of the network packet, changing values of the bits in the selected positions to a bit value combination selected from all possible bit value combinations in the selected positions to modify the content and calculating a further error-detecting code of the modified content until the further error-detecting code of the modified payload matches the error-detecting code received via the communication channel or all possible bit combinations have been selected, and if the further error-detecting code does not match the error-detecting code, requesting for retransmission of the network packet.

21 Claims, 16 Drawing Sheets

(51) Int. Cl.
*G06N 3/08* (2006.01)
*G06N 20/00* (2019.01)

(56) References Cited

U.S. PATENT DOCUMENTS

| | | | |
|---|---|---|---|
| 5,968,197 A * | 10/1999 | Doiron | H04L 1/188 |
| | | | 714/748 |
| 6,418,549 B1 | 7/2002 | Ramchandran | |
| 6,505,253 B1 | 1/2003 | Chiu et al. | |
| 6,523,068 B1 | 2/2003 | Beser et al. | |
| 7,016,658 B2 | 3/2006 | Kim et al. | |
| 7,124,205 B2 | 10/2006 | Craft et al. | |
| 7,447,234 B2 | 11/2008 | Colas et al. | |
| 7,664,883 B2 | 2/2010 | Craft et al. | |
| 7,848,350 B1 | 12/2010 | Inamdar | |
| 7,971,131 B1 | 6/2011 | Ordentilch | |
| 8,223,643 B1 | 7/2012 | Wolfgang | |
| 8,305,963 B1 | 11/2012 | Breau | |
| 8,327,232 B2 | 12/2012 | Budampati et al. | |
| 8,352,830 B2 | 1/2013 | Landschaft et al. | |
| 8,437,267 B2 | 5/2013 | Amir et al. | |
| 8,473,821 B2 | 6/2013 | Taghavi Nasrabadi et al. | |
| 8,693,406 B2 | 4/2014 | Ahmadi | |
| 8,990,663 B2 | 3/2015 | Liu et al. | |
| 10,270,564 B2 | 4/2019 | Djukic et al. | |
| 10,491,569 B1 | 11/2019 | Powell | |
| 10,749,594 B1 | 8/2020 | O'Shea et al. | |
| 11,088,784 B1 | 8/2021 | Gopalan et al. | |
| 11,191,049 B1 | 11/2021 | Chandrasekher et al. | |
| 11,368,250 B1 | 6/2022 | Chandrasekher et al. | |
| 11,368,251 B1 | 6/2022 | Chandrasekher et al. | |
| 2001/0030954 A1 | 10/2001 | Hameleers | |
| 2002/0026523 A1 | 2/2002 | Mallory et al. | |
| 2002/0054608 A1 | 5/2002 | Wan | |
| 2002/0122510 A1 | 9/2002 | Yakhnich et al. | |
| 2003/0215029 A1 | 11/2003 | Limberg | |
| 2004/0170120 A1 | 9/2004 | Reunamaki et al. | |
| 2005/0094561 A1 | 5/2005 | Raaf | |
| 2005/0208897 A1 | 9/2005 | Lyons | |
| 2006/0021040 A1 | 1/2006 | Boulanger | |
| 2006/0047862 A1 | 3/2006 | Shearer et al. | |
| 2006/0268996 A1 | 11/2006 | Sethi et al. | |
| 2007/0168197 A1 | 7/2007 | Vasilache | |
| 2008/0002688 A1 | 1/2008 | Kim et al. | |
| 2008/0002790 A1 | 1/2008 | Itoh | |
| 2008/0126824 A1 | 5/2008 | Lee et al. | |
| 2008/0225735 A1 | 9/2008 | Qiu | |
| 2008/0250299 A1 | 10/2008 | Maillet et al. | |
| 2009/0086711 A1 | 4/2009 | Capretta et al. | |
| 2009/0119566 A1 | 5/2009 | Hiromitsu | |
| 2009/0125779 A1 | 5/2009 | Vermeiden et al. | |
| 2009/0276686 A1 | 11/2009 | Liu et al. | |
| 2010/0037270 A1 | 2/2010 | Bennett | |
| 2010/0165868 A1 | 7/2010 | Gersemsky | |
| 2010/0192175 A1 | 7/2010 | Bachet | |
| 2010/0202416 A1 | 8/2010 | Wilhelmsson et al. | |
| 2010/0262885 A1 | 10/2010 | Cheng | |
| 2011/0131461 A1 | 6/2011 | Schulz | |
| 2011/0206019 A1 | 8/2011 | Zhai et al. | |
| 2011/0206065 A1 | 8/2011 | Kim et al. | |
| 2011/0216787 A1 | 9/2011 | Ai et al. | |
| 2012/0300642 A1 | 11/2012 | Abel et al. | |
| 2013/0018889 A1 | 1/2013 | Jagmohan | |
| 2013/0132786 A1 | 5/2013 | Tanigawa et al. | |
| 2013/0198591 A1 | 8/2013 | Kamuf et al. | |
| 2013/0223203 A1 | 8/2013 | Bai | |
| 2013/0250179 A1 | 9/2013 | Lida | |
| 2013/0339036 A1 | 12/2013 | Baeckstroem et al. | |
| 2014/0140342 A1 | 5/2014 | Narad | |
| 2014/0241309 A1 * | 8/2014 | Hilton | H04B 3/54 |
| | | | 370/330 |
| 2015/0009902 A1 | 1/2015 | Emmanuel | |
| 2016/0006842 A1 | 1/2016 | Tahir | |
| 2016/0062954 A1 | 3/2016 | Ruff | |
| 2016/0254881 A1 | 9/2016 | Meylan | |
| 2016/0261375 A1 | 9/2016 | Roethig | |
| 2017/0006616 A1 | 1/2017 | Singh et al. | |
| 2017/0012799 A1 | 1/2017 | Jiang | |
| 2017/0269876 A1 | 9/2017 | Mukhopadhyay et al. | |
| 2018/0013808 A1 | 1/2018 | Petry et al. | |
| 2018/0048567 A1 | 2/2018 | Ignatchenko | |
| 2018/0101957 A1 | 4/2018 | Talathi | |
| 2018/0267850 A1 | 9/2018 | Froelich et al. | |
| 2018/0288198 A1 | 10/2018 | Pope et al. | |
| 2018/0314985 A1 | 11/2018 | O'Shea | |
| 2018/0359811 A1 | 12/2018 | Verzun et al. | |
| 2019/0028237 A1 | 1/2019 | Pan et al. | |
| 2019/0037052 A1 | 1/2019 | Deshpande | |
| 2019/0097680 A1 | 3/2019 | O'Brien | |
| 2019/0097914 A1 | 3/2019 | Zhong et al. | |
| 2019/0392266 A1 | 12/2019 | Zhong et al. | |
| 2019/0393903 A1 | 12/2019 | Mandt et al. | |
| 2020/0099470 A1 | 3/2020 | Licardie | |
| 2020/0128279 A1 | 4/2020 | Han et al. | |
| 2020/0177418 A1 | 6/2020 | Hoydis et al. | |
| 2020/0213152 A1 | 7/2020 | Choquette et al. | |
| 2020/0320371 A1 * | 10/2020 | Baker | G06N 20/00 |
| 2020/0383169 A1 | 12/2020 | Takahashi et al. | |
| 2021/0014939 A1 | 1/2021 | Verzun et al. | |
| 2021/0034846 A1 | 2/2021 | Ko et al. | |
| 2021/0056058 A1 | 2/2021 | Lee et al. | |
| 2021/0120440 A1 | 4/2021 | Reimann et al. | |
| 2021/0319286 A1 | 10/2021 | Gunduz | |
| 2021/0392033 A1 | 12/2021 | Haartsen | |
| 2022/0045696 A1 | 2/2022 | Boussard | |
| 2022/0114436 A1 | 4/2022 | Gopalan et al. | |
| 2022/0209893 A1 | 6/2022 | Chandrasekher et al. | |
| 2022/0209894 A1 | 6/2022 | Chandrasekher et al. | |
| 2022/0209895 A1 | 6/2022 | Chandrasekher et al. | |
| 2022/0209896 A1 | 6/2022 | Gopalan et al. | |
| 2022/0209897 A1 | 6/2022 | Jiang et al. | |
| 2022/0209909 A1 | 6/2022 | Chandrasekher et al. | |
| 2022/0210250 A1 | 6/2022 | Chandrasekher et al. | |

OTHER PUBLICATIONS

Kim et al., "Deepcode: Feedback Codes via Deep Learning," [online] Jul. 2, 2018 [retrieved on Apr. 17, 2020], Retrieved from the Internet: < URL:https://arxiv.org/abs/1807.00801v1>, 24 pages.

Gopalan et al., "Systems and Methods for Artificial Intelligence Discovered Codes", U.S. Appl. No. 17/069,794, filed Oct. 13, 2020, Specification, Claims, Abstract, and Drawings, 43 pages.

Goutay et al., "Deep reinforcement learning autoencoder with noisy feedback." 2019 International Symposium on Modeling and Optimization in Mobile, Ad Hoc, and Wireless Networks (WiOPT). IEEE, Jun. 24, 2019, 6 pages.

Yamamoto et al., "Application of Yarnarnoto-Itoh coding scheme to discrete rnernoryless broadcast channels." 2017 IEEE International Symposium on Information Theory (ISIT). IEEE, 2017, 5 pages.

Aoudia et al., "End-to-end learning of communications systems without a channel model." 2018 52nd Asilornar Conference on Signals, Systems, and Computers. IEEE, Dec. 5, 2018, 6 pages.

Duman et al., "On optimal power allocation for turbo codes." Proceedings of IEEE International Symposium on Information Theory. IEEE, Jun. 29-Jul. 4, 1997, 1 page.

Arvinte et al., "Deep log-likelihood ratio quantization." 2019 27th European Signal Processing Conference (EUSIPCO). IEEE, 2019, 5 pages.

Kötter et al., "Coding for Errors and Erasures in Random Network Coding", IEEE Transactions on Information Theory 54.8; 3579-3591. Mar. 25, 2008; Retrieved on Feb. 19, 2022 (Feb. 19, 2022) from <https://arxiv.org/pdf/cs/0703061.pdf> entire document; 30 pages.

Grcar, Joseph, "How ordinary elimination became Gaussian elimination", Historia Mathematica vol. 3 Issue 2, May 2011; Available online Sep. 28, 2010; pp. 163-218.

"International Search Report" and "Written Opinion", Patent Cooperation Treaty Application No. PCT/US2021/054265, dated Nov. 24, 2021, 24 pages.

(56) References Cited

OTHER PUBLICATIONS

"International Search Report" and "Written Opinion", Patent Cooperation Treaty Application No. PCT/US2021/0063356, dated Jan. 14, 2022, 9 pages.

"international Search Report" and "Written Opinion", Patent Cooperation Treaty Application No. PCT/US2021/061902, dated Jan. 24, 2022, 11 pages.

\* cited by examiner

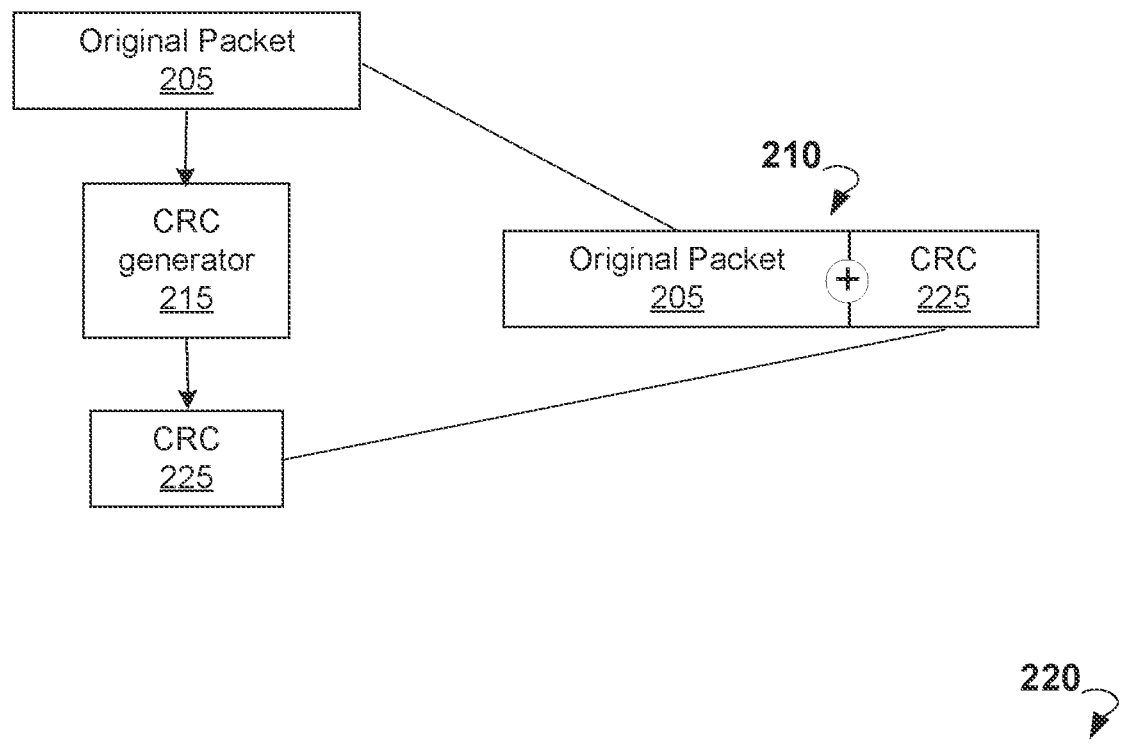
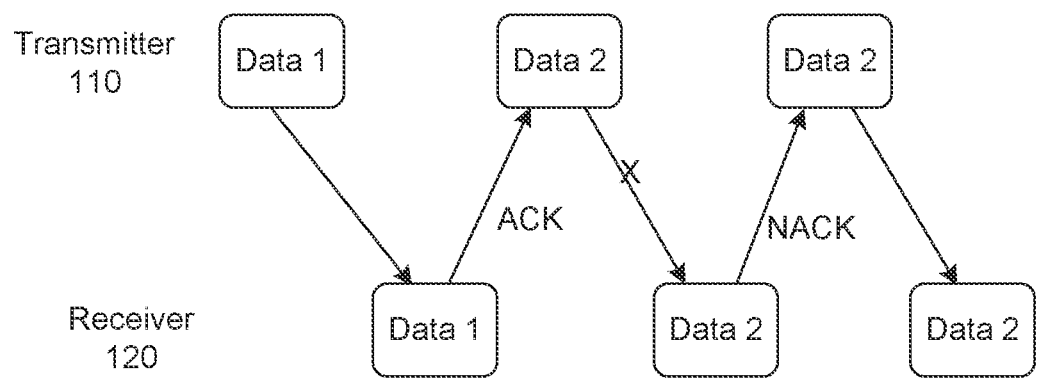
FIG. 2

ERROR CORRECTION IN NETWORK PACKETS

TECHNICAL FIELD

The present disclosure relates generally data processing, and, more specifically, to systems and methods for error correction in network packets.

BACKGROUND

Reliable transmission of network packets via communication channels is an important issue. Network packets transmitted over communication channels can be corrupted. Conventional methods of sending network packets include resending a network packet if the network packet is corrupted during the initial transmission. These methods, however, may cause inefficiencies in data transmission between computing systems or electronic devices due to the time and resources such as bandwidth and power required for resending the network packets.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present disclosure are directed to data processing, and, more specifically, to error correction in network packets. According to an example embodiment, a method for error correction in network packets may include receiving a network packet via a communication channel. The network packet may include a content (such as the payload and metadata) and an error-detecting code associated with the content of the network packet. The method may include determining, based on the error-detecting code, that the network packet is corrupted. The method may then provide for selecting a pre-determined number of positions of bits in the content of the network packet. The method may include (A) changing values of the bits in the selected positions to a bit value combination selected from all possible bit value combinations in the selected positions to modify the content and (B) calculating a further error-detecting code of the modified payload. The method may perform operations (A) and (B) until the further error-detecting code of the modified content matches the error-detecting code received via the communication channel or all possible bit combinations have been selected. If the further error-detecting code of the modified content does not match the error-detecting code, the method may proceed with a request for retransmission of the network packet.

The pre-determined number positions of bits in the content (e.g., payload) can be less than the length of the content. The selection of the pre-determined number of positions of bits in the content of the network packet may include accumulating a sequence of copies of the network packet received in response to the request for retransmission, determining, based on the copies of the network packets, values of bits at positions in the payload and confidence levels of the values, and selecting the pre-determined number of positions having the lowest confidence levels.

The determination of the value at the position in the content may include averaging values of bits at the position in the multiple copies of network packets. The determination of the confidence level of the value at the position can include determining a distance between the value and 1 or 0.

A value at the position in the content and confidence level of the value at the position can be determined with a machine learning model and based on a matrix of values of bits in the copies of network packet. The matrix can be formed by values of bits at pre-defined number of neighboring positions in the copies. The machine learning model may include a neural network (e.g., a convolutional neural network, artificial neural network, Bayesian neural network, supervised machine learning neural network, semi-supervised machine learning neural network, unsupervised machine learning neural network, reinforcement learning neural network, and so forth) trained on a training set of network packets transferred via the communication channel.

The error-detecting code may include a cyclic redundancy check. The network packet can be encoded using the error correction code of the communication channel. The communication channel can include a wireless communication channel.

According to another embodiment, a system for error correction in network packets can be provided. The system may include at least one processor and a memory storing processor-executable codes, wherein the processor can be configured to implement the operations of the above-mentioned method for error correction in network packets.

According to yet another aspect of the disclosure, there is provided a non-transitory processor-readable medium, which stores processor-readable instructions. When the processor-readable instructions are executed by a processor, they cause the processor to implement the above-mentioned method for error correction in network packets.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example and not limitation in the figures of the accompanying drawings, in which like references indicate similar elements.

FIG. 2 is a block diagram showing an example network packet and an automatic repeat request (ARQ) method for data transmission, according to some example embodiments of the present disclosure.

DETAILED DESCRIPTION

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

The present disclosure provides methods and systems for error correction in network packets. An example method for error correction in network packets may include receiving a network packet via a communication channel. The network packet may include content (e.g., payload and metadata) and an error-detecting code associated with the content. The method may include determining, based on the error-detecting code, that the network packet is corrupted. The method may allow selecting a pre-determined number of positions of bits in the payload of the network packet. The method may include (A) changing values of the bits in the selected positions to a bit value combination selected from all possible bit value combinations in the selected positions to modify the payload and (B) calculating a further error-detecting code of the modified payload.

The method may perform operations (A) and (B) until the further error-detecting code of the modified payload matches the error-detecting code received via the communication channel or all possible bit combinations have been tried. If the further error-detecting code of the modified payload does not match the error-detecting code, the method can proceed with a request for retransmission of the network packet.

Figure 1:
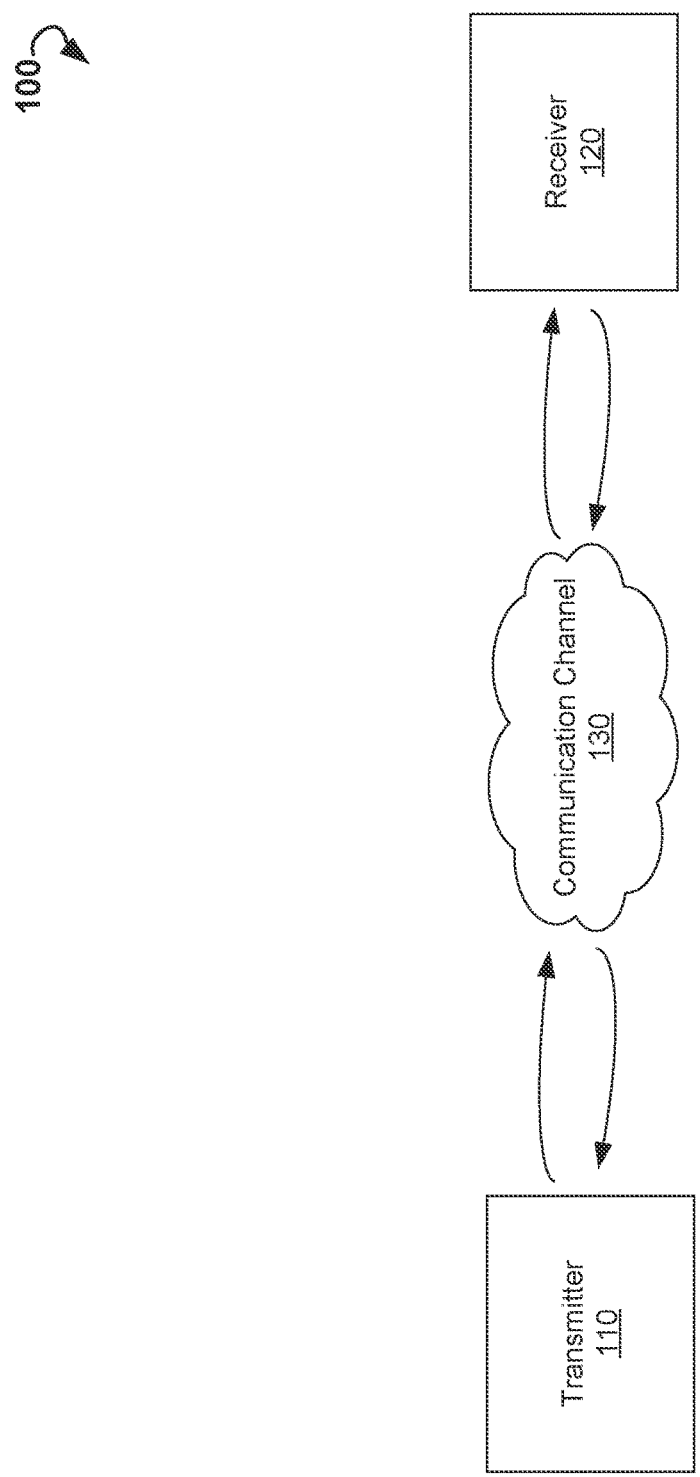
FIG. 1 is a block diagram of an environment, in which systems and methods for error correction in network packets can be implemented, according to some example embodiments.

Referring now to the drawings, FIG. 1 is a block diagram of environment 100, in which systems and methods for error correction in network packets can be implemented, according to some example embodiments. The environment 100 may include a transmitter 110, a receiver 120, and a communication channel 130. The transmitter 110 may send network packets over the communication channel 130. The receiver 120 may receive the network packets and analyze integrity of the network packets. If the receiver 120 determines that a network packet is corrupted, the receiver 120 may request that the transmitter 110 retransmit the network packet.

In various embodiments, the transmitter 110 or receiver 120 may include a computer (e.g., laptop computer, tablet computer, and desktop computer), a server, a cellular phone, a smart phone, a gaming console, a multimedia system, a smart television device, wireless headphones, set-top box, an infotainment system, in-vehicle computing device, informational kiosk, smart home computer, software application, computer operating system, a modem, a router, and so forth.

The communication channel 130 may include the Internet or any other network capable of communicating data between devices. Suitable networks may include or interface with any one or more of, for instance, a local intranet, a corporate data network, a data center network, a home data network, a Personal Area Network, a Local Area Network (LAN), a Wide Area Network (WAN), a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The data network 140 can further include or interface with any one or more of a Recommended Standard 232 (RS-232) serial connection, an IEEE-1394 (FireWire) connection, a Fiber Channel connection, an IrDA (infrared) port, a Small Computer Systems Interface connection, a Universal Serial Bus (USB) connection or other wired or wireless, digital or analog interface or connection, mesh or Digi® networking.

FIG. 2 is a block diagram showing an example network packet 210 and an automatic repeat request (ARQ) method 220 for data transmission, according to some example embodiments of the present disclosure.

Transmitter 110 may send, via communication channel 130, a network packet including a binary message $x \in \{0,1\}^n$. The receiver 120 may receive a binary message $y \in \{0,1\}^n$, which is the message x corrupted by the communication channel 130. The message can be corrupted due to the noise in communication channels, which is typically the main cause of packet loss. The packet loss results in defects, such as reduced throughput of transmitted data, degraded audio quality, and so forth. Typically, communication schemes such as cyclic redundancy check (CRC) and the ARQ are used to mitigate the packet loss.

CRC 225 is an error-detecting code used to determine whether a network packet is corrupted. CRC 225 is generated by CRC generator 215 based on an original packet 205 and added to the original packet 205 (the payload) to form the network packet 210. The network packet 210 is transmitted from the transmitter 110 to receiver 120 via the communication channel 130. CRC 225 is typically 3 bytes long regardless of the length of the payload. When the network packet with CRC 225 is received, the receiver 120 computes the new CRC based on payload of the received the network packet and compares the new CRC to the appended CRC 225. If the appended CRC 225 mismatches the new CRC computed from the received payload, the network packet 210 is corrupted.

ARQ is a communication method in which if the network packet 210 is detected as corrupted, the receiver 120 requests the transmitter 110 to retransmit the network packet 210. The ARQ stops when the network packet 210 is received correctly or the maximum timeout is reached. Typically, ARQ discards previous versions of received network packets, and therefore information from previously received packets is not used.

ARQ+CRC is an approach widely used in Bluetooth™, Wi-Fi™ and 3G/4G/LTE/5G networks. However, ARQ+CRC is not efficient because even if only 1-bit in the received network packet 210 is wrong (resulting in a CRC check failure), the whole network packet 210 is retransmitted. Thus, Block Error Rate (BLER) of ARQ+CRC scheme can be lower than desired.

According to embodiments of the present disclosure, prior to requesting retransmission of the network packet 210, the receiver 120 can modify a few bits in the payload of the received network packet and test CRC again. Given a payload of length L, and assuming that only 1-bit in the payload is erroneous, modifying all possible 1-bits in the payload would require checking CRC $2^L$ times. This is computationally infeasible and can drastically reduce the validity of CRC. If there are more than one erroneous bit in the payload, than the number of CRC checks is even more than $2^L$.

To solve this issues, embodiments of the present disclosure allow extracting soft information to determine which bits in the payload are most unreliable (uncertain). The soft information may include expected values of bits, also referred to as soft likelihoods. Some embodiments of the present disclosure may provide a method for modifying the unreliable bits to test CRC, without drastically reducing the validity of the CRC.

In conventional ARQ schemes, when the network packet 210 is retransmitted, the previous copies of the network packet are discarded and not used. Embodiments of the present disclosure can improve performance of the ARQ by using a simple voting scheme. The voting scheme can use all received copies of a network packet to make a vote on each bit in the network packet and output the majority voted result. Then, the result of the voting can be used to test CRC.

Typically, channel errors are modeled as independent and identically distributed (i.i.d) errors. However, the errors observed in real systems are correlated to each other. The correlation of errors originated from two sources: 1) a design of a communication channel, for example Bluetooth™'s Gaussian frequency-shift keying (GFSK) modulation which can cause error correlations; and 2) burst noise and interference in electronic circuits of transmitters and receivers.

Figure 3:
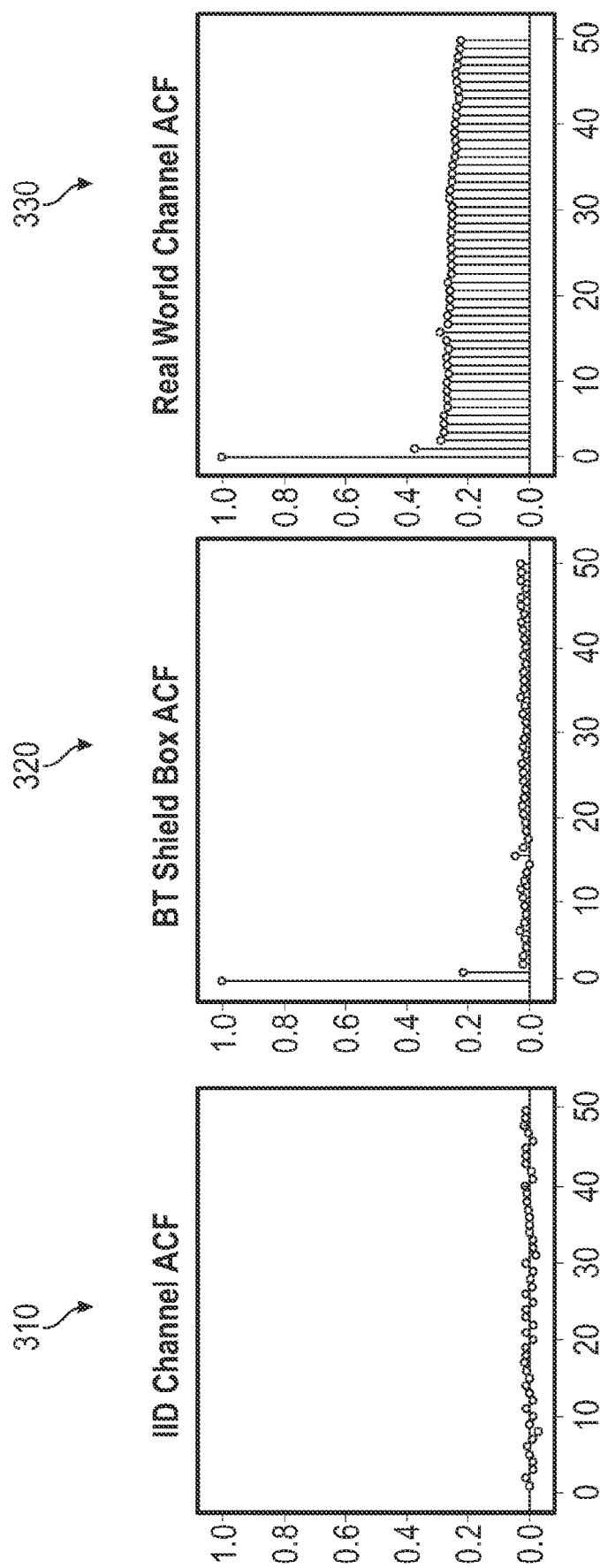
FIG. 3 shows example plots of an auto correlation function (ACF) of error occurrences in network packets transmitted via communications channels.

FIG. 3 shows example plots of an auto correlation function (ACF) of error occurrences in network packets transmitted via communications channels. The plot 310 is an ACF of error occurrences in network packets transmitted via an IDD channel. Plot 320 is an ACF of error occurrences in a Bluetooth™ channel under ideal channel conditions. The plot 330 is an ACF of error occurrences in "real world" channel having burst noise and interference. The plot 320 shows that the error occurrences are correlated even under ideal channel conditions. The information on correlations due to the design of channel and burst noise and interference can be used to extract soft information for bits.

Figure 4:
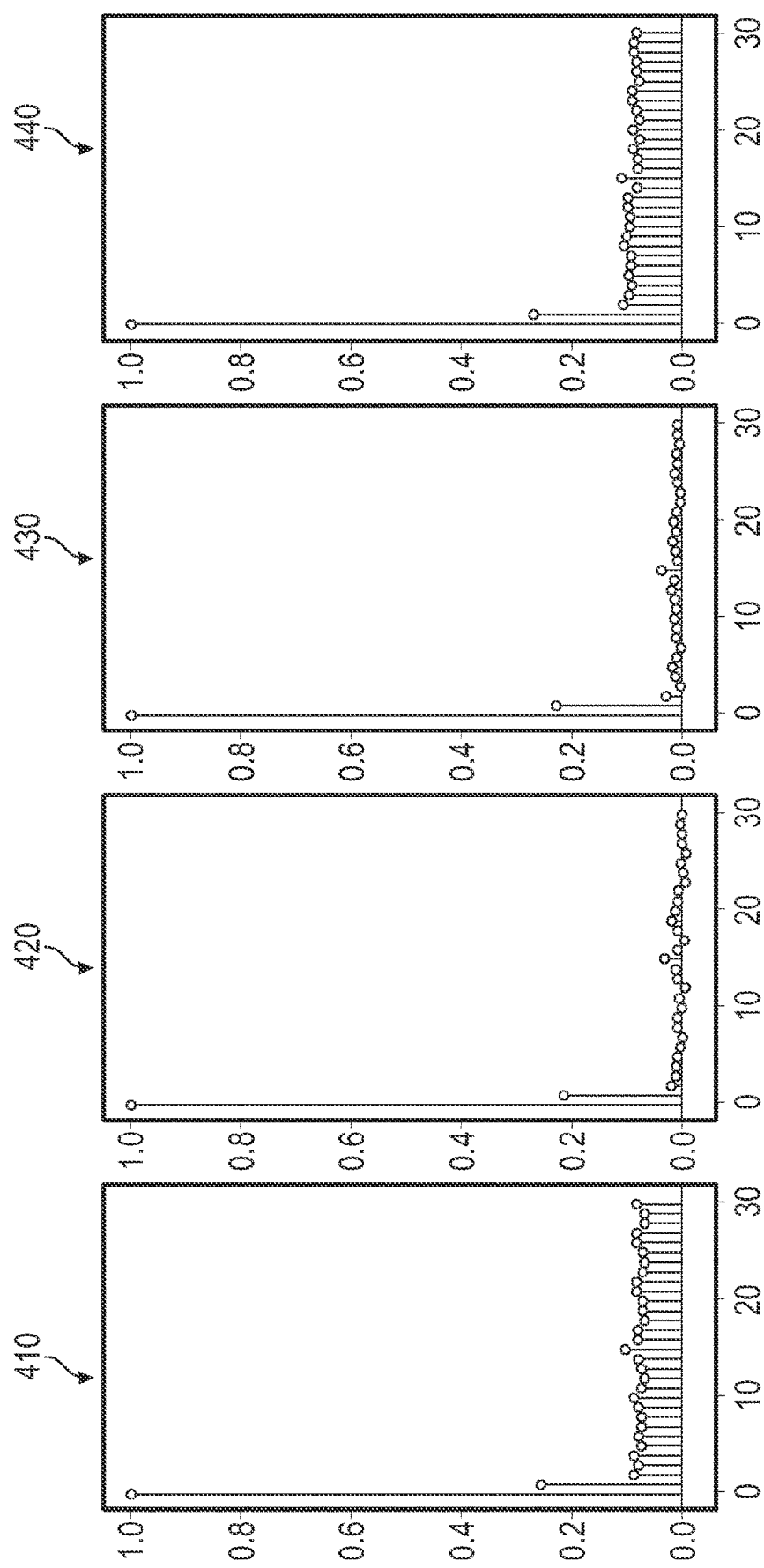
FIG. 4 shows further example plots of ACF of error occurrences in network packets transmitted via a communication channel in different locations.

FIG. 4 shows further example plots of ACFs of error occurrences in network packets transmitted via a communication channel. Plot 410 is an ACF of error occurrences in first indoor conditions. Plot 420 is an ACF of error occurrences in second indoor conditions. Plot 430 is an ACF of error occurrences in outdoor conditions. Plot 440 is an ACF of error occurrences in office conditions. Thus, different communication channels may have different error statistics. The communication channel may also have different error statistics in different locations. Extraction of soft information associated with error bits can be optimized and adapted individually for each type of communication channel.

Figure 5:
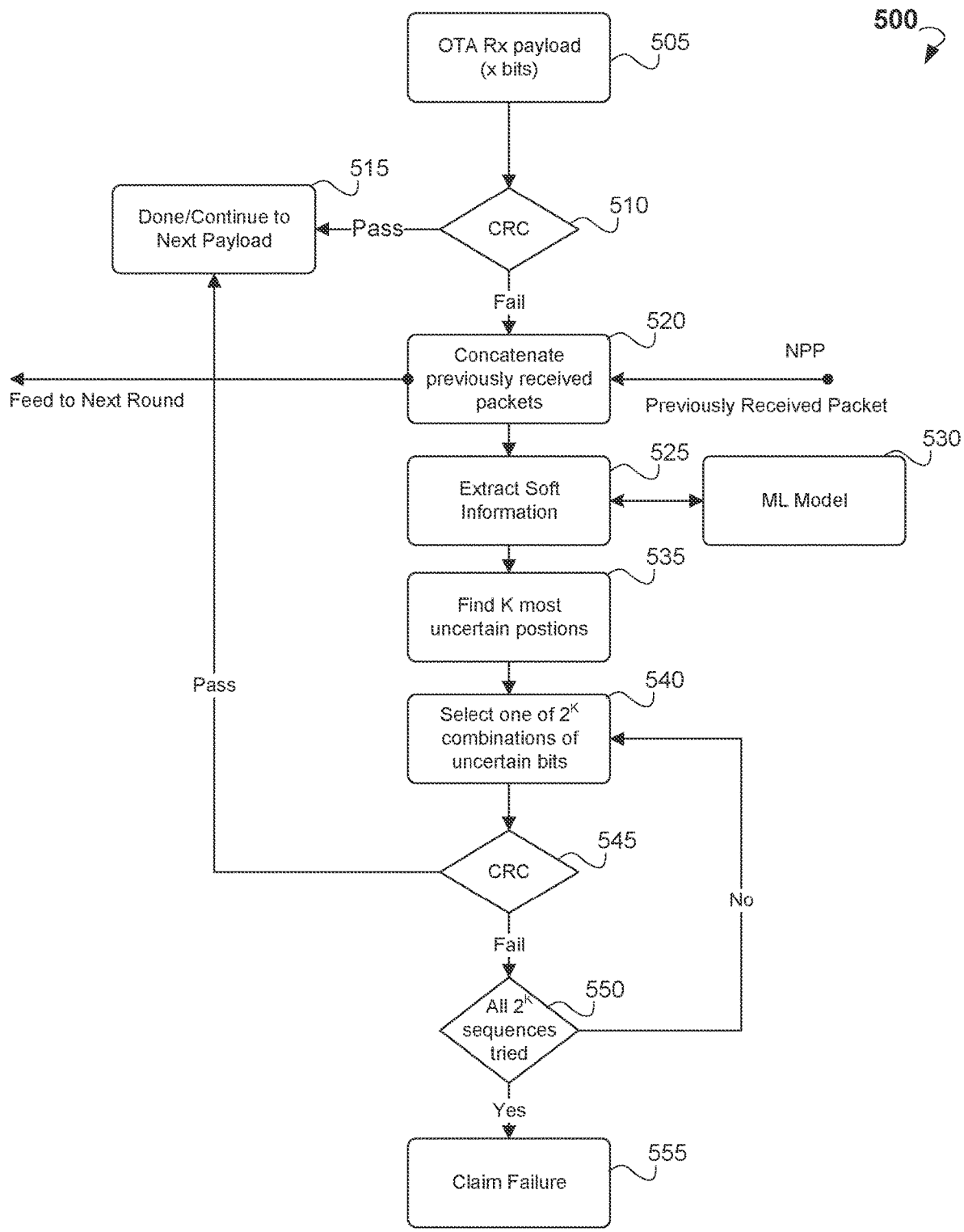
FIG. 5 is a flow chart showing a method for error correction in network packets, according to various example embodiments of the present disclosure.

FIG. 5 is a flow chart a method 500 for error correction in network packets, according to various example embodiments of the present disclosure. The method 500 is also referred to as a neural packet processor (NPP) method 500. The method 500 can be performed by receiver 120 in environment 100 as shown in FIG. 1. The NPP method 500 may include ARQ, CRC, and soft information processing. In general, the NPP method 500 includes the following: (1) checking the CRC of the received network packet, and if the CRC fails then (2) using previously received network packets to extract soft information to propose multiple alternative sequences of bits and to check CRC again.

The NPP method 500 may commence in block 505 with receiving a network packet having a payload of x bits and CRC. In decision block 510, the NPP method 500 may include calculating CRC for the received payload and comparing the calculated CRC with received CRC. If the CRC check passes, the NPP method 500 may proceed, in block 515, with processing next network packet.

If CRC check fails, the NPP method 500 may proceed, in block 520, with concatenating the network packet with previously received copies of the network packet. The current copy of the network packet can be stored in a memory and used in the next round (attempt) of receiving and processing a copy of the network packet.

In block 525, the NPP method 500 may include extracting soft information from the copies of the network packet. In some embodiments, the soft information may include expected values (soft likelihoods) for bits in positions of payload of the network packet. For example, the expected values can be real numbers between 0 to 1. An expected value for a position j can be obtained by a machine learning (ML) model 530 based on values of bits at position j in all the copies of the network packet and values of bits in positions neighboring to j in all the copies of the network packet.

In block 535, the NPP method 500 may include using the soft information to select K positions in the payload with most uncertain values of bits. For example, the NPP method 500 may include determining levels of uncertainty for positions of bits in the payload. A level of uncertainty for a position j can be found as a minimum between a distance of an expected value at the position j from 1 and a distance of the expected value at the position j from 0. The NPP method 500 may select positions having K largest levels of uncertainty.

In block 540, the NPP method 500 may include selecting a combination of values of K bits from $2^K$ possible combinations of values of bits at the selected K positions. The NPP method 500 may change the values at the selected K positions to the selected combination of values to obtain a modified payload of the network packet.

In block 545, the NPP method 500 may include calculating CRC for the modified payload. If the CRC of the modified payload matches the CRC in the received network packet, then errors in the payload are corrected and the NPP method 500 may proceed, in block 515, with processing next network packet.

If the CRC of the modified payload does not match the CRC in the received network packet, the NPP method 500 may proceed, in block 550, with checking if all possible combinations of values of K bits have been selected and tested. If not all of the possible combinations are tested, the NPP method 500 may proceed, in block 540, with selecting a next combination.

If all possible combinations have been selected and tested, the NPP method 500 may proceed, in block 555, under assumption that the network packet cannot be corrected. In this case, the NPP method 500 may proceed with a request for retransmission of the network packet.

Figure 6:
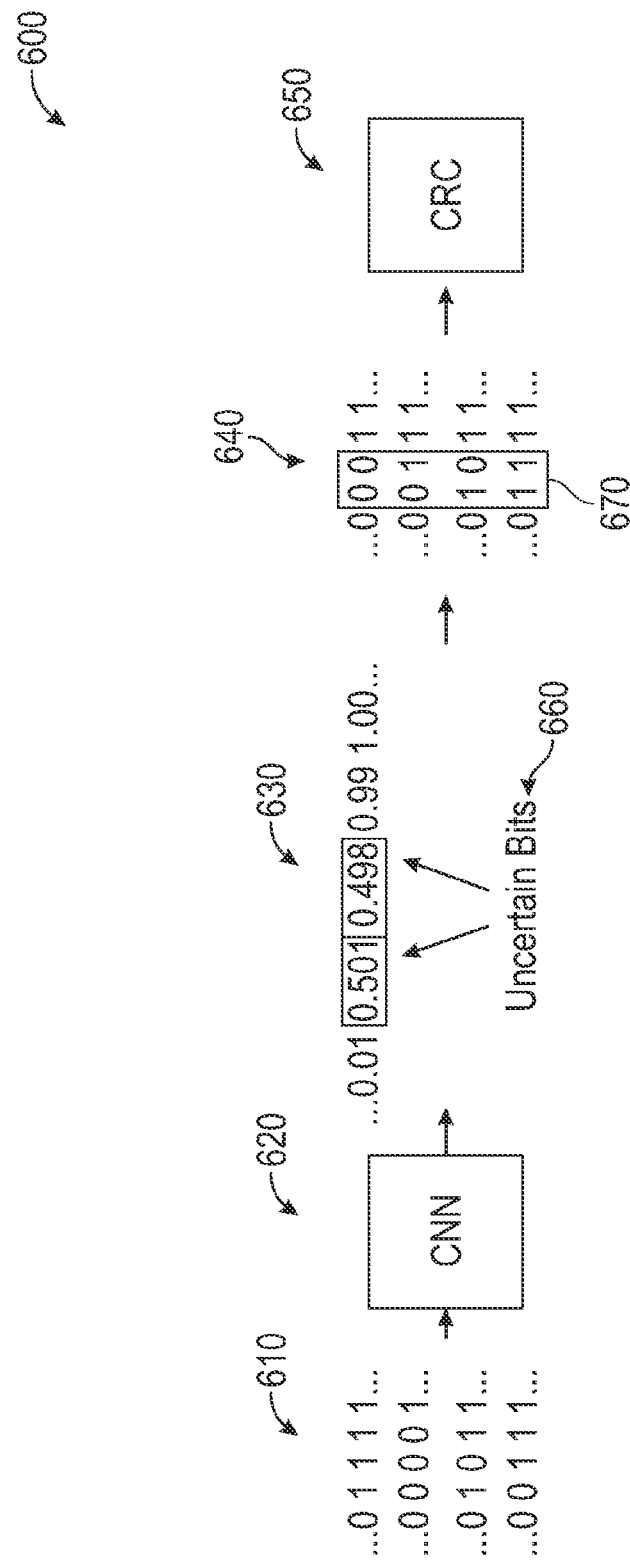
FIG. 6 is a schematic showing a process of determining uncertain bits in a network packet based on soft information and generating alternative sequences of bits, according to some example embodiments of the present disclosure.

FIG. 6 is a schematic showing a process 600 of determining uncertain bits in network packet based on soft information and generating alternative sequences of bits. A neural network can be used as ML model to extract soft information 630 from copies 610 of a network packet. The neural network may include at least one of a convolutional neural network (CNN) 620 an artificial neural network, a Bayesian neural network, a supervised machine learning neural network, a semi-supervised machine learning neural network, an unsupervised machine learning neural network, a reinforcement learning neural network, and so forth. The copies 610 of the network packet are arranged in rows. The soft information may include real numbers between 0 and 1, where a value near 0.5 indicates that the ML model is uncertain about the value of the corresponding bit. In example of FIG. 6, the positions 660 are two positions with most uncertain values of bits in the network packet according to the soft information 630. Bits at positions other than 660 can be assigned either 0 or 1 670 based on the values of real numbers in the soft information 630.

The process 600 may further generate all possible combinations of sequences 640 of bits by changing the values of bits at positions 660. In the example of FIG. 6, there are $2^2=4$ combinations of bits at two positions resulting in four alternative sequences 640. The sequences 640 can be used to test CRC 650. If any of these proposed alternative sequences can pass CRC 650, no additional retransmissions of the network packet are needed. In general, the number of alternative sequences increases exponentially with increase of number K of positions with uncertain bits. Therefore, number K needs to be restricted. According to one embodiment of the present disclosure, number K can be fixed as 4 in order to balance the trade-off between the runtime and Block Error Rate (BLER) performance of the communication channel.

In some embodiments, the ML model may predict confidence levels for the bits instead of levels of uncertainty. A confidence level of a bit can be inversely proportional to a level of uncertainty. In these embodiments, a pre-determined number of bits having the lowest confidence levels can be selected to be modified to form alternative sequences for testing CRC 650.

Figures 7A, 7B:
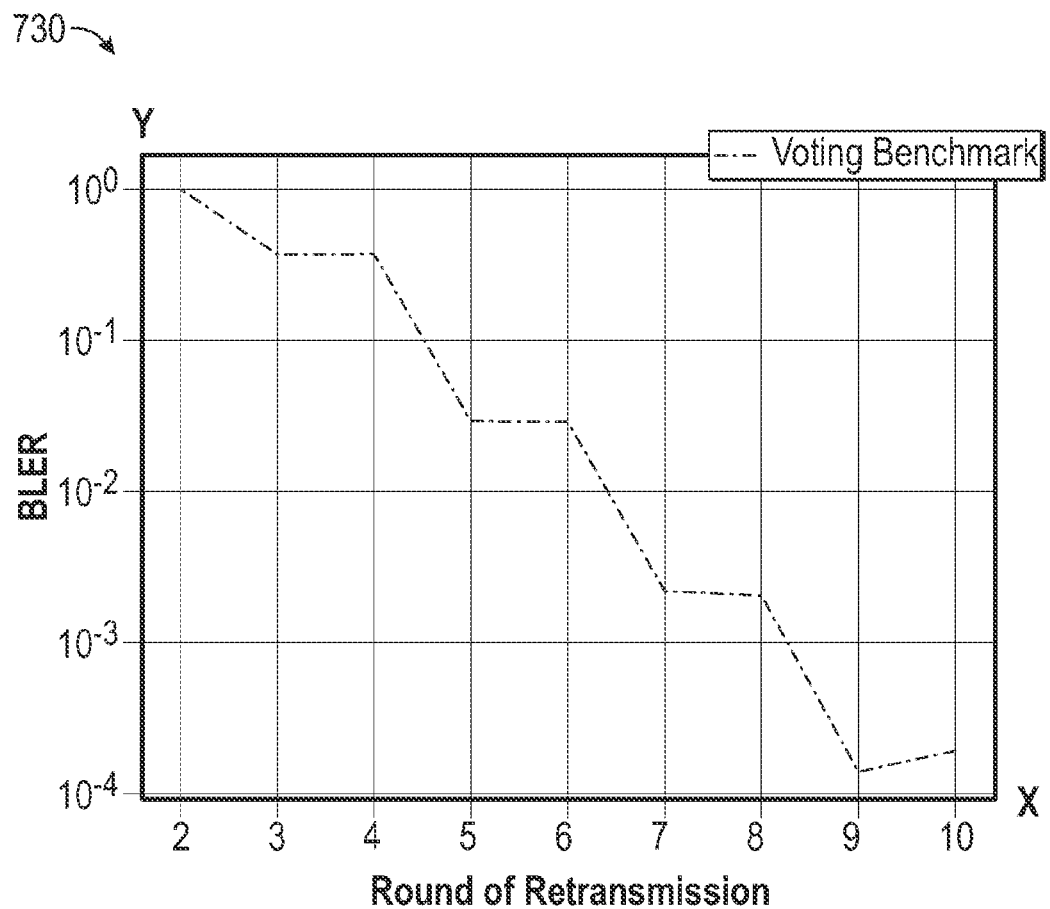
FIG. 7A is schematic showing results of extracting soft information from the copies of a network packet by voting and Machine Learning (ML) model, according to some example embodiments of the present disclosure.
FIG. 7B is a plot of a Block Error Rate (BLER) of a method for error correction in network packets using a voting system.

FIG. 7A is schematic showing results of extracting soft information from the copies of a network packet by voting 710 and ML model 720. The voting 710 is a rule that generates either 1 or 0 based on the majority of 1s or 0s at given uncertain position across all copies of the network packet. However, the voting 710 has two issues: 1) it does not use information concerning the error occurrence correlation in a communication channel; and 2) when number of copies of network packet is even, then number of occurrences of 1s and 0s can be also equal at the same position in copies of the network packet. Then, voting is no better than guessing.

In contrast to voting 710, ML model 720 can use information from neighbor positions to provide an expected value of a bit. The ML model 720 can be trained for a particular communication channel to effectively account for the correlation of error occurrences individual to this particular communication channel.

FIG. 7B is a plot 730 of a BLER of a method for error correction in network packets using voting. The y-coordinate of the plot 730 is BLER value. The x-coordinate is a number of rounds of retransmission of network packet, which is a number of copies of the network packet used in voting. Performance of voting for even rounds is similar to performance for odd rounds, which makes even round information useless.

Figure 8:
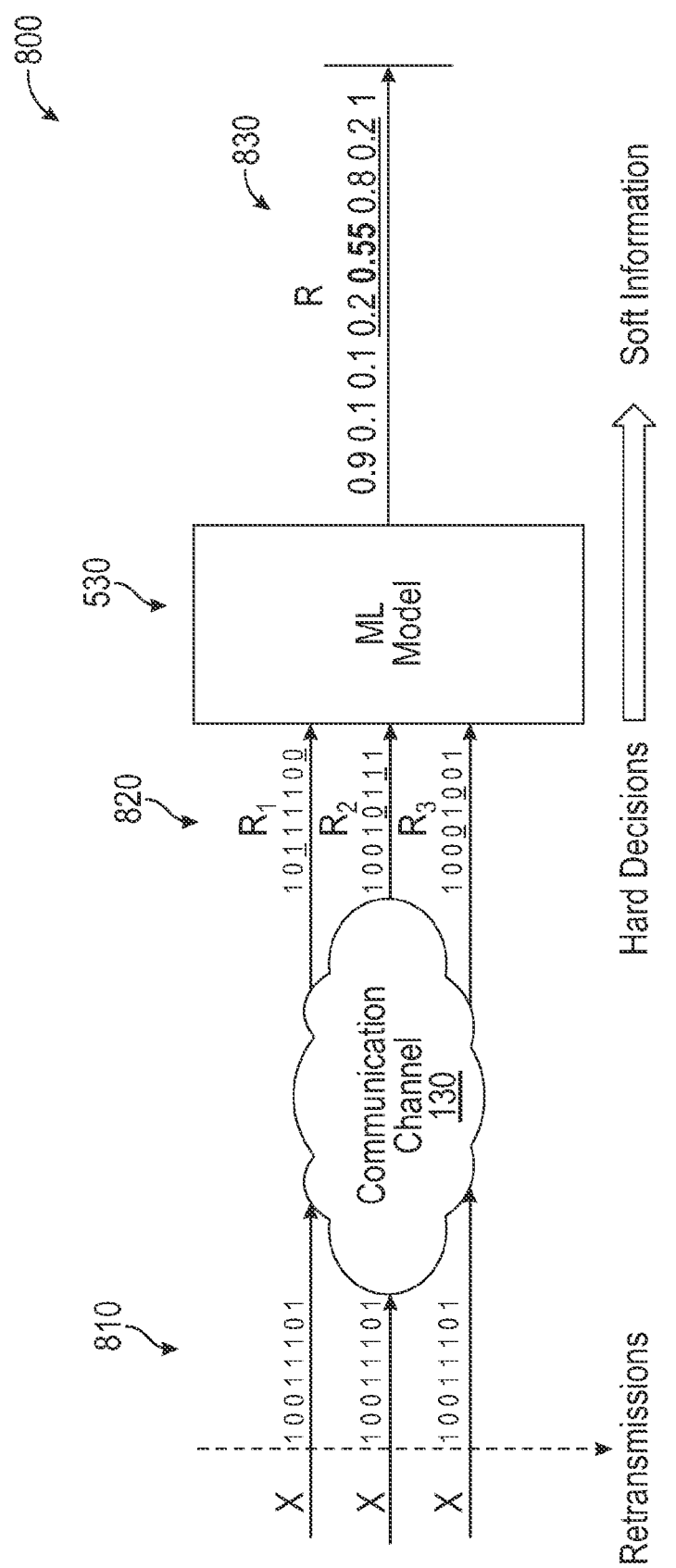
FIG. 8 is a schematic showing an example process for generating soft information by a ML model, according to some example embodiments of the present disclosure.

FIG. 8 is a schematic showing an example process 800 of generating soft information by a ML model, according to some embodiments of the present disclosure. The copies 810 of a message X are sent through the communication channel 130. The copies 810 can be corrupted as sequences $R_1, \ldots, R_M$ 820. During each ARQ round, when CRC 650 fails, the received sequences $R_1, \ldots, R_M$ 820 can be cached in a memory. The ML model 530 may combine all previously received sequences to generate soft information 830.

The ML model 530 can be trained to generate soft information R from observed hard decision data $R_1, \ldots, R_M$. The input to the ML model 530 has a shape [L, M], where M is the number of rounds for retransmissions of the network packet and L is the length of the network packet. The output of the ML model 530 is the soft information 830 of shape [L, 1]. For round 2 with two received sequences, the input of the ML model 530 is two sequences $R_1, R_2$. For round 3 with three received sequences, the input of the ML model 530 is three sequences $R_1, R_2, R_3$. The size of the input increases as the number of rounds increases, thus for round 10 there are 10 received sequences $R_1, \ldots, R_{10}$ as input to ML model 530 to generate soft information 830. To make design simple, nine ML models can be built: for round 2, 3, . . . , and 10, respectively. The ML model 530 is not needed for round 1 because bits are certain for all positions and only hard information (either 0 or 1) can be extracted from a single bit sequence.

Typically, the ML model 530 is trained with inputs $R_1, \ldots, R_M$ as data set and ground truth of soft information R. However, in this case, there is no ground truth of soft information available. Instead, the original message X is known. To obtain the soft information, the ML model can be trained in binary classification settings, which use Binary Cross-Entropy (BCE) loss with input $R_1, \ldots, R_M$ and target X, instead of R. The ML model produces $p=f(R_1, \ldots, R_M)$. The ML model may utilize a sigmoid activation function to force the predicted value to be between 0 and 1. The BCE loss can be defined as follows:

$$\text{BCE Loss} = 1/L \Sigma_{i=1}^{L} - X^{(i)} \log(\hat{p}^{(i)}) - (1 - X^{(i)}) \log(1 - \hat{p}^{(i)})$$

Using X as the training target, the output p of ML model is a soft likelihood. Optimizing the loss function means that likelihood p is calibrated to be as accurate as possible. At the end of the training, the output (the soft likelihood p) can be used as soft information to check CRC.

Given nine ML models, the format of training data set is $((R_1, R_2), X), \ldots, ((R_1, \ldots, R_{10}), X)$. With increase of length L of the network packet (X), the amount of training data increases exponentially. To avoid extensively collecting all input/output pairs for data collection, error vectors can be collected first by assuming that noise of communication channel 130 does not depend on the network packet.

Figure 9:
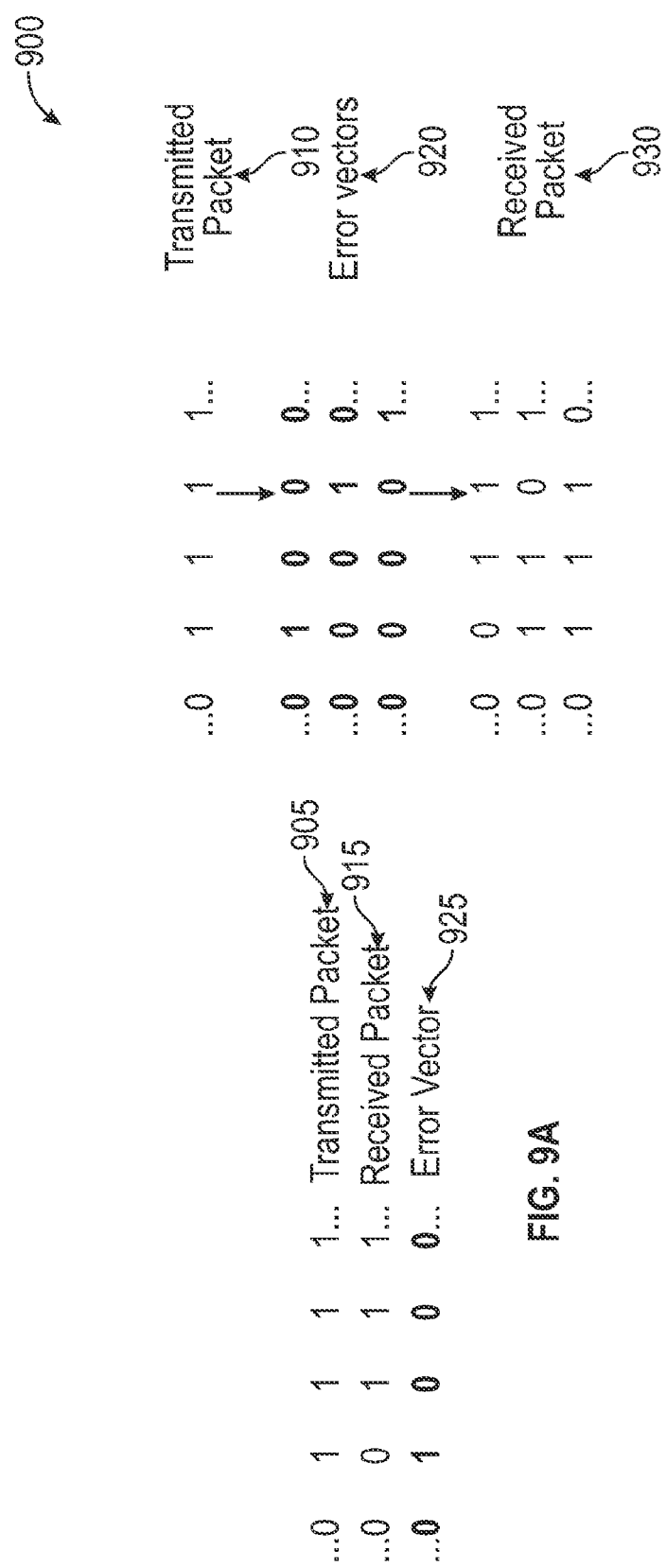
FIG. 9A shows a network packet being transmitted, a received network packet, and an error vector.
FIG. 9B is a schematic illustrating training of an ML model, according to one example embodiment of the present disclosure.

FIG. 9A shows transmitted network packet 905, received network packet 915 and error vector 925. The error vector can be obtained in real communication environment, by XOR of the transmitted network packet 905 and received network packet 915. In the error vector 925, 1 means that there is an error in transmission, 0 means that there is no error in transmission. The error vector 925 is a sparse sequence because numbers of 1s is much less than numbers of 0s. Therefore, the error vector can be saved efficiently by sparse encoding. For different channels, different sets of error vectors can be stored. Similar to data augmentation in computer vision, shifting the error vector by a small number, and inversing the error vector still makes the error vector valid. These techniques can improve data storage efficiency.

FIG. 9B is a schematic 900 showing details of training the ML model 530, according to an example embodiment. The ML model can be trained in a supervised learning fashion. The target sequences X can be randomly generated in batches.

The inputs of the ML model $(R_1, \ldots, R_M)$ for M rounds can be generated by randomly corrupting a transmitted sequence X (transmitted packet 910). The transmitted sequence X can be corrupted with sampled error vectors 920 M times: $R_i = X \oplus e_i$ to generate received network packet 930.

The ML model is a function $f_i(.)$ for each round i from 2 to 10. The loss function is BCE between outputs and targets sequence:

$$L = \Sigma_{M \in \{2,3,4,5,6,7,8,9,10\}} \text{BCE}(f_i(R_1, \ldots, R_M), X)$$

Because the ML model is being trained for multiple number of rounds, the losses from each round are summed. The Adam optimizing algorithm can be used to minimize the loss function using at least 500 number of epochs until convergence of parameters of the ML model.

There are two types of general-purpose deep learning models that can be used for ML model: Recurrent Neural Network (RNN) and CNN having 1 dimension (CNN1D). RNN has the following disadvantages: 1) empirical RNN, such as LSTM/GRU, are more complicated than CNN, and harder to train, 2) RNN models are harder to compress and distill to deploy in tinyML environments. Therefore, CNN are preferable ML model for extracting the soft information.

Figure 10:
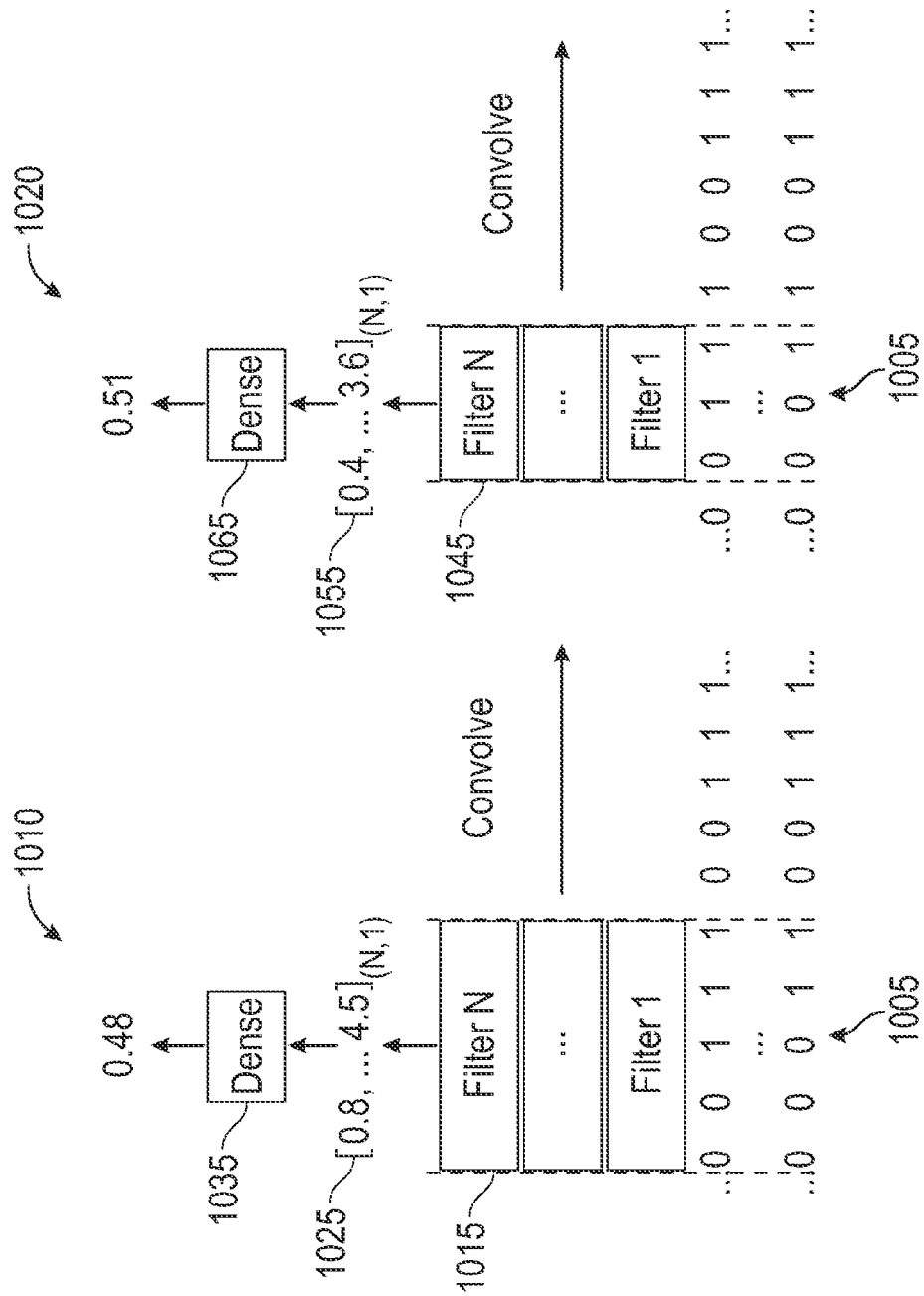
FIG. 10 shows convolutional neural network (CNN) models that can be used as ML models, according to some example embodiments of the present disclosure.

FIG. 10 shows a CNN model 1010 and a CNN model 1020 that can be used as ML model, according to some example embodiments of the present disclosure. The CNN model 1010 includes a convolutional 1D layer 1025 and a dense layer 1035. The CNN model 1020 includes a convolutional 1D layer 1055 and a dense layer 1065. The number of CNN filters (denoted as 1015 and 1045) is 100 in both CNN model 1010 and CNN model 1020.

The kernel size of filters can be critical for CNN model. The kernel size 3 can be preferable due to the following reasons:

1) because ACF of error occurrences in communication channel is significant for lag 1 as shown in FIG. 2. This correlation can be captured by kernel size 3.

2) the empirical results show that CNN model with kernel size 3 produce the same result as CNN models with kernel sizes 5, 11, and 41.

3) CNN model kernel size 3 has much smaller number of parameters, which makes the model light.

In example of FIG. 10, the CNN model 1010 has a kernel of size 5 and the CNN model 1020 has a kernel of size 3. For the same bit position 1005, the CNN model 1010 outputs the soft likelihood 0.48 and the CNN model 1020 outputs the soft likelihood 0.51.

Figure 11:
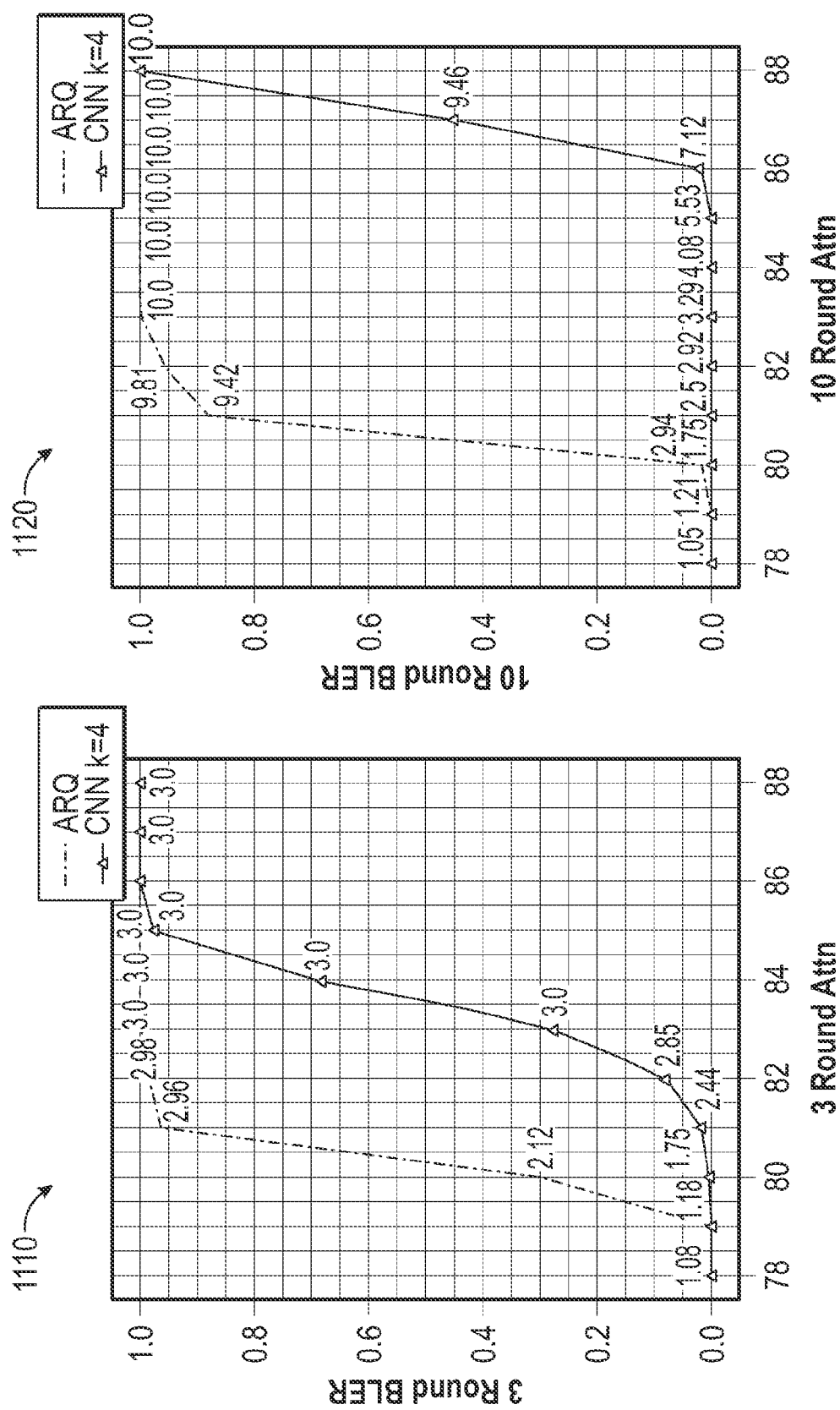
FIG. 11 shows example plots of the BLER for error correction of network packets and the ARQ scheme.

FIG. 11 shows example plots 1110 and 1120 of the BLER for NPP method and ARQ scheme. The plot 1110 is BLER for NPP method that uses 3 maximum rounds for retransmission of network packets. The plot 1120 is BLER for NPP method that uses 10 maximum rounds for retransmission of network packets. In shield box environments, the NPP method with maximum 3 rounds of retransmissions can show 2 dB gain on BLER over an ARQ scheme. The NPP method with maximum 10 rounds of retransmissions can show more than 6 dB gain over ARQ system. Even in near zero BLER region, NPP method requires at least 40% less rounds of retransmission than ARQ scheme, which can be power efficient. It should be noted that only receiver side requires some modifications to implement NPP method.

Figure 12:
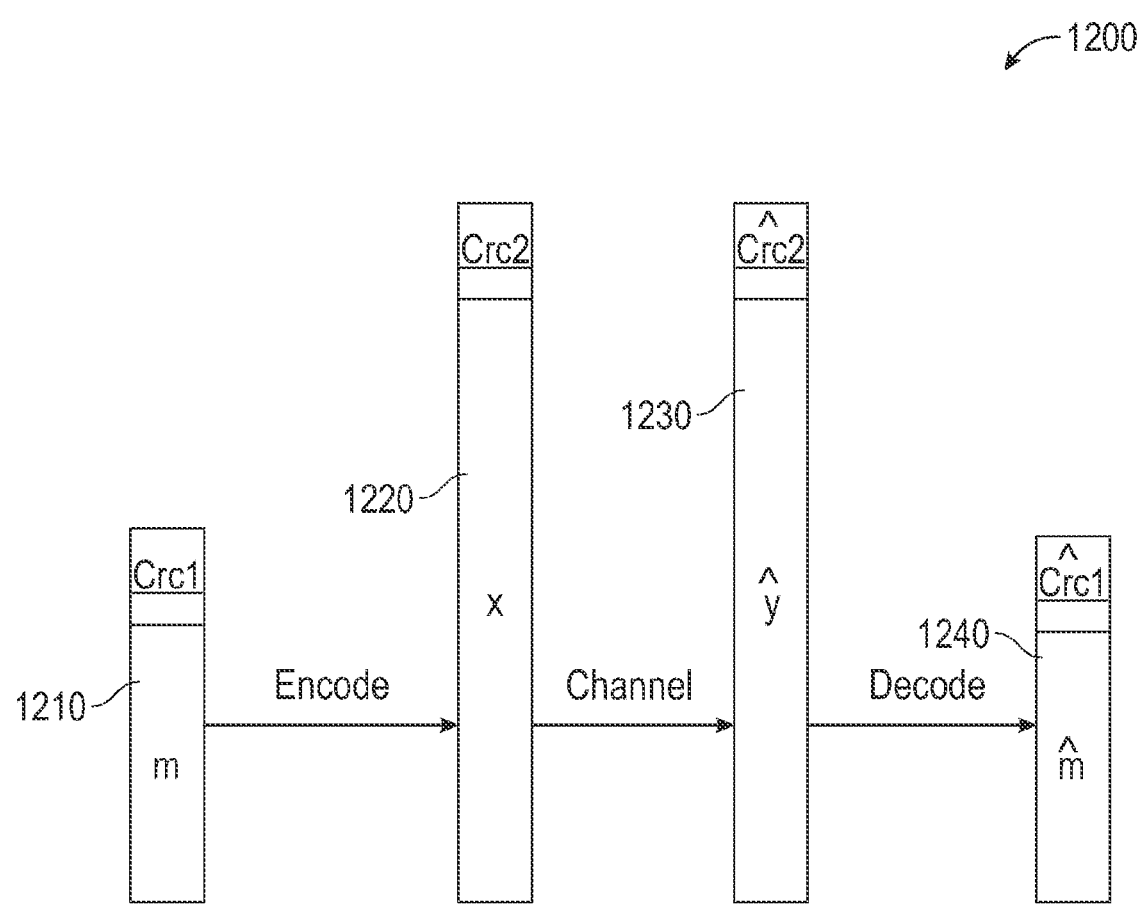
FIG. 12 is a schematic showing an example coding scheme used in communication channels.

The NPP method 500 shown in FIG. 5 can be extended to transmitters and receivers that adapt communication channel coding. FIG. 12 is a schematic of an example coding scheme 1200 used in communication channels. The coding scheme 1200 adds parity check bits to the network packet 1210 prior to transmitting the network packet 1210 via a communication channel. The encoded network packet 1220 may include more bits than original network packet 1210. The encoded network 1220 packet may have different CRC (denoted as CRC2) than CRC (denoted as CRC1) of original network packet. The receiver obtains an encoded network packet 1230, which is the encoded network packet 1220 contaminated by a noise of the communication channel. The encoded network packet 1230 can be decoded by the receiver to obtain the decoded network packet 1240. The decoded network packet 1240 may still include some errors as compared to the original network packet 1210.

There are two methods to design NPP extensions to coded systems: 1) Decode-then-NPP, and 2) NPP-then-Decode. Due to the powerful error correction ability of channel coding, NPP-then-Decode approach shows 1 dB better performance than Decode-then-NPP approach.

Figure 13:
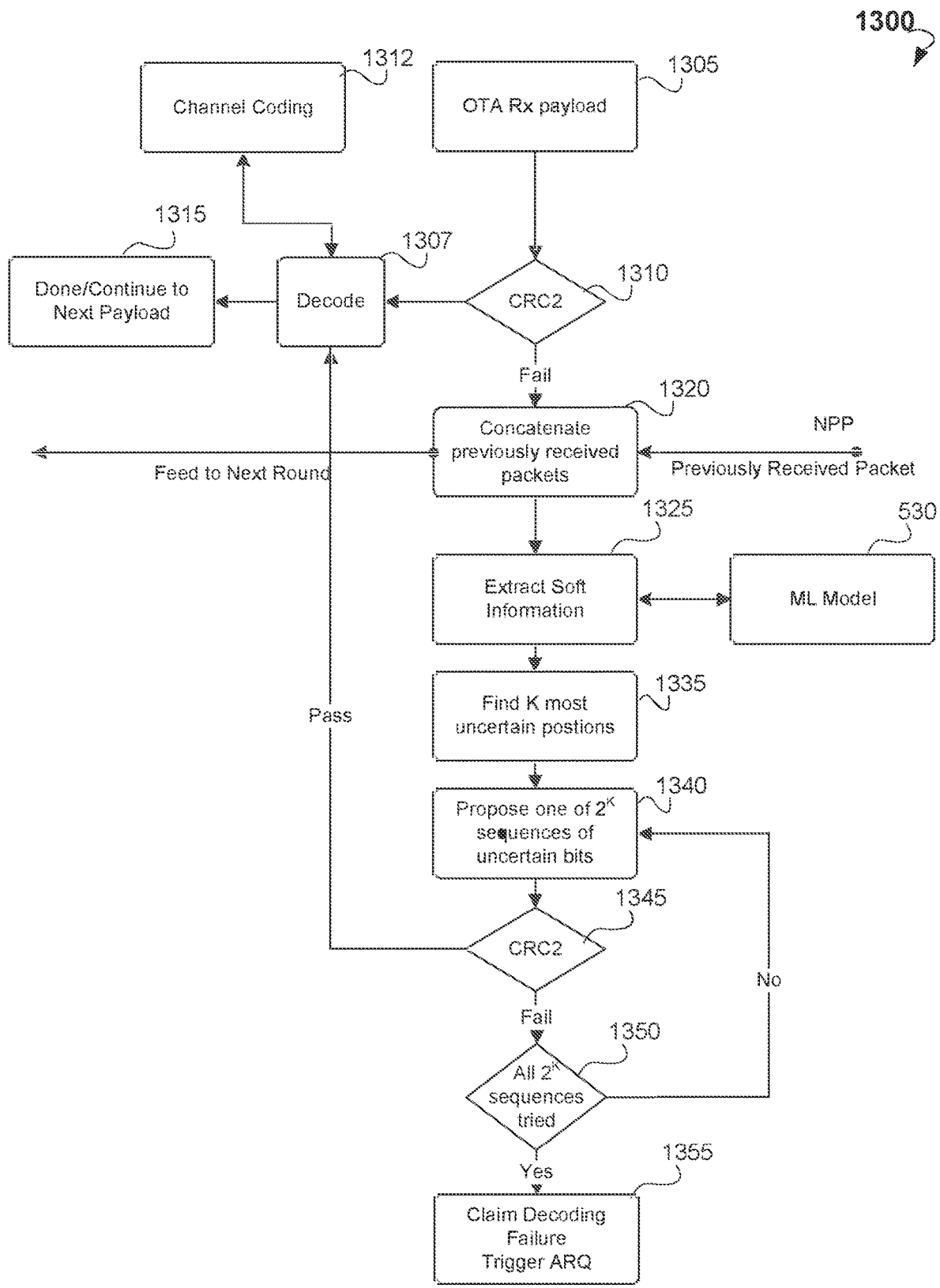
FIG. 13 is a flow chart showing a method for error correction in encoded network packets, according to an example embodiment of the present disclosure.

FIG. 13 is a flow chart showing a method 1300 for error correction in encoded network packets, according to an example embodiment. The method 1300 uses NPP-then-Decode scheme. The method 1300 can be performed by the receiver 120 in environment 100 as shown in FIG. 1.

The method 1300 may commence in block 1305 with receiving an encoded network packet. In decision block 1310, the NPP method 1300 may calculate CRC2 for a payload of the encoded network packet and compare the calculated CRC2 with received CRC2. If CRC2 check passes, then the method 1300 may proceed, in block 1307, with decoding the encoded network packet using communication channel coding scheme 1312. The method 1300 then proceeds with processing next encoded network packet in block 1315.

If CRC2 check fails, then the method 1300 may proceed, in block 1320, with concatenating the encoded network packet with previously received copies of the encoded network packet. The current copy of the encoded network packet can be stored in a memory to be used in the next round (attempt) of receiving and processing a copy of the encoded network packet.

In block 1325, the method 1300 may proceed with extracting soft information from the copies of the encoded network packet. In some embodiments, the soft information may include expected values (also referred to as soft likelihoods) for bits in positions of payload of the encoded network packet. For example, the expected values can be real numbers between 0 to 1. An expected value for a position j can be obtained by an ML model 530 based on values of bits at position j in all the copies of the encoded network packet and values of bits in positions neighboring to j in all the copies of the encoded network packet.

In block 1335, the method 1300 may proceed with using the soft information to select K positions in the payload with most uncertain values of bits. For example, the method 1300 may include determining levels of uncertainty for positions of bits in the payload. Level of uncertainty for a position j can be found as a minimum between a distance of an expected value at the position j from 1 and a distance of the expected value at the position j from 0. The method 1300 may select positions having K largest levels of uncertainty.

In block 1340, the method 1300 may proceed with selecting a combination of values of K bits from 2K possible combinations of values of bits at the selected K positions. The method 1300 may change the values at the selected K positions to the selected combination of values to obtain a modified payload of the encoded network packet.

In block 1345, the method 1300 may proceed with calculating CRC2 for the modified payload of encoded network packet. If the CRC2 of the modified payload matches the CRC2 in the received encoded network packet, errors in the payload are corrected and the method 1300 may proceed, in block 1307 with decoding the modified encoded network packet using communication channel coding scheme 1312. The method 1300 then proceeds with processing next encoded network packet in block 1315.

If the CRC2 of the modified payload does not match the CRC2 in the received encoded network packet, the method 1300 proceeds, in block 1350, with checking if all possible combinations of values of K bits has been selected and tested. If not all the possible combinations are tested, the method 1300 proceeds, in block 1340, with selecting a next combination.

If all possible combinations have been selected and tested unsuccessfully, the method 1300 may proceed, in block 1355, with determining that the encoded network packet cannot be corrected efficiently. In this case, the method 1300 may proceed with a request for retransmission of the encoded network packet.

Figure 14:
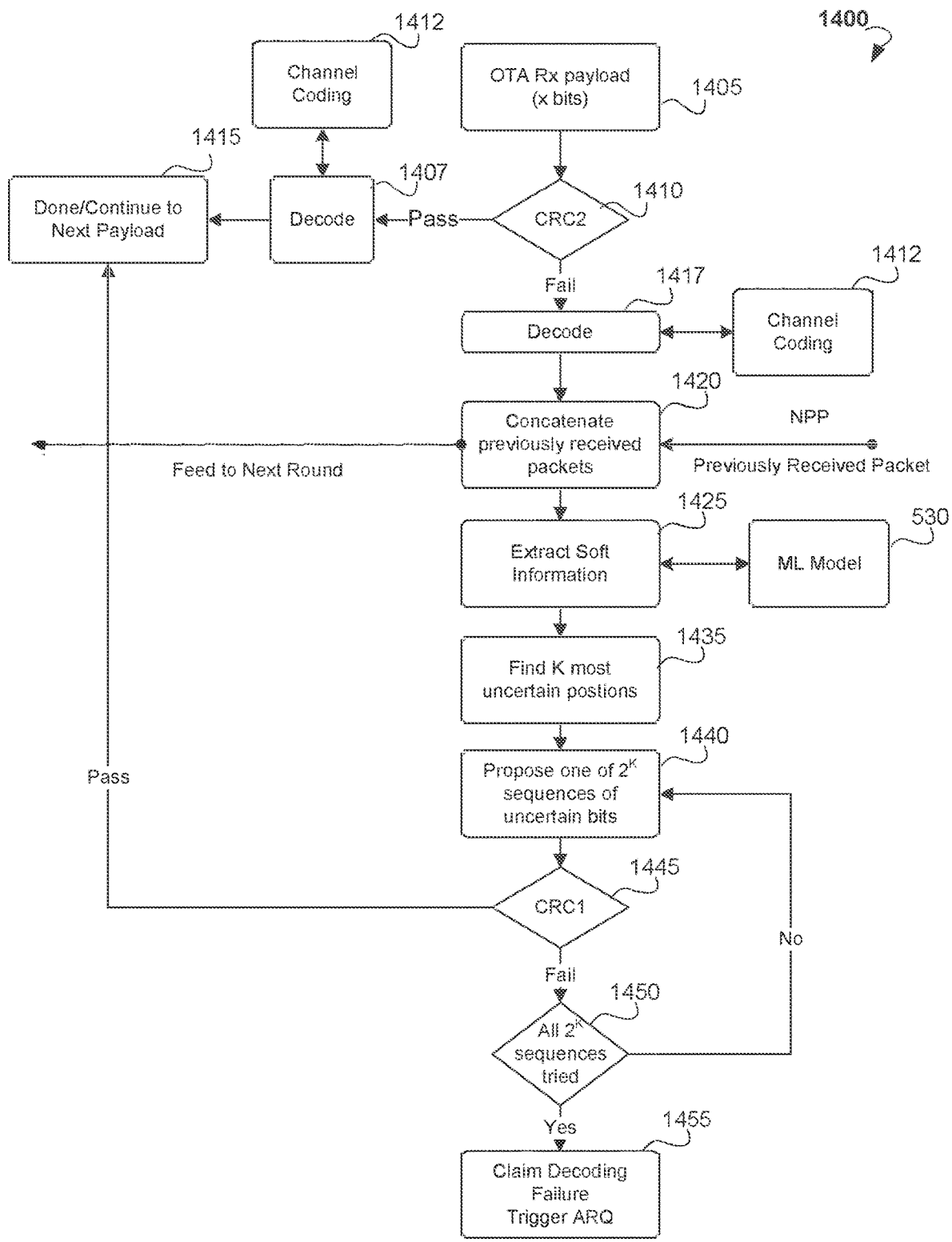
FIG. 14 is a flow chart showing a method for error correction in encoded network packets, according to another example embodiment of the present disclosure.

FIG. 14 is a flow chart of a method 1400 for error correction in encoded network packets, according to another example embodiment. The method 1400 uses Decode-then-NPP scheme. The method 1400 can be performed by the receiver 120 in environment 100 as shown in FIG. 1.

The method 1400 may commence in block 1405 with receiving an encoded network packet having. In decision block 1410, the method 1400 may calculate the CRC2 for a payload of the encoded network packet and compare the calculated CRC2 with received CRC2. If CRC2 check passes, then the method 1400 may proceed, in block 1407, with decoding the encoded network packet using communication channel coding scheme 1412. The method 1400 then proceeds with processing next encoded network packet in block 1415.

If CRC2 check fails, the method 1400 may proceed, in block 1417, with decoding the encoded network packet using communication channel coding scheme 1412.

In block 1420, the method 1400 may concatenate the decoded network packet with previously received copies of the decoded network packet. The current copy of the decoded network packet can be stored in a memory to be used in the next round (attempt) of receiving and processing a copy of the encoded network packet.

In block 1425, the method 1400 may proceed with extracting soft information from the copies of the decoded network packet. In some embodiments, the soft information may include expected values (also referred as soft likelihoods) for bits in positions of payload of the decoded network packet. For example, the expected values can be real numbers between 0 to 1. An expected value for a position j can be obtained by a ML model 530 based on values of bits at position j in all the copies of the decoded network packet and values of bits in positions neighboring to j in all copies of the decoded network packet.

In block 1435, the method 1400 may include using the soft information to select K positions in the payload with most uncertain values of bits. For example, the method 1400 may include determining levels of uncertainty for positions of bits in the payload. A level of uncertainty for the position j can be found as a minimum between a distance of an expected value at the position j from 1 and a distance of the expected value at the position j from 0. The method 1400 may select positions having K largest levels of uncertainty.

In block 1440, the method 1400 may include selecting a combination of values of K bits from 2K possible combinations of values of bits at the selected K positions. The method 1400 may change the values at the selected K positions to the selected combination of values to obtain a modified payload of the decoded network packet.

In block 1445, the method 1400 may proceed with calculating CRC1 for the modified payload of decoded network packet. If the CRC1 of the modified payload matches the CRC1 in the received decoded network packet, errors in the payload are corrected and the method 1400 may proceed, in block 1415, with processing next encoded network packet.

If the CRC1 of the modified payload does not match the CRC1 in the received decoded network packet, the method 1400 may proceed, in block 1450, with checking whether all possible combinations of values of K bits have been selected and tested. If not all the possible combinations have been tested, the method 1400 may proceed, in block 1440, with selecting a next combination.

If all possible combinations have been selected and tested, then the method 1400 may proceed, in block 1455, with claiming that the decoded network packet cannot be corrected. In this case, the method 1400 may proceed with a request for retransmission of the encoded network packet.

Figure 15:
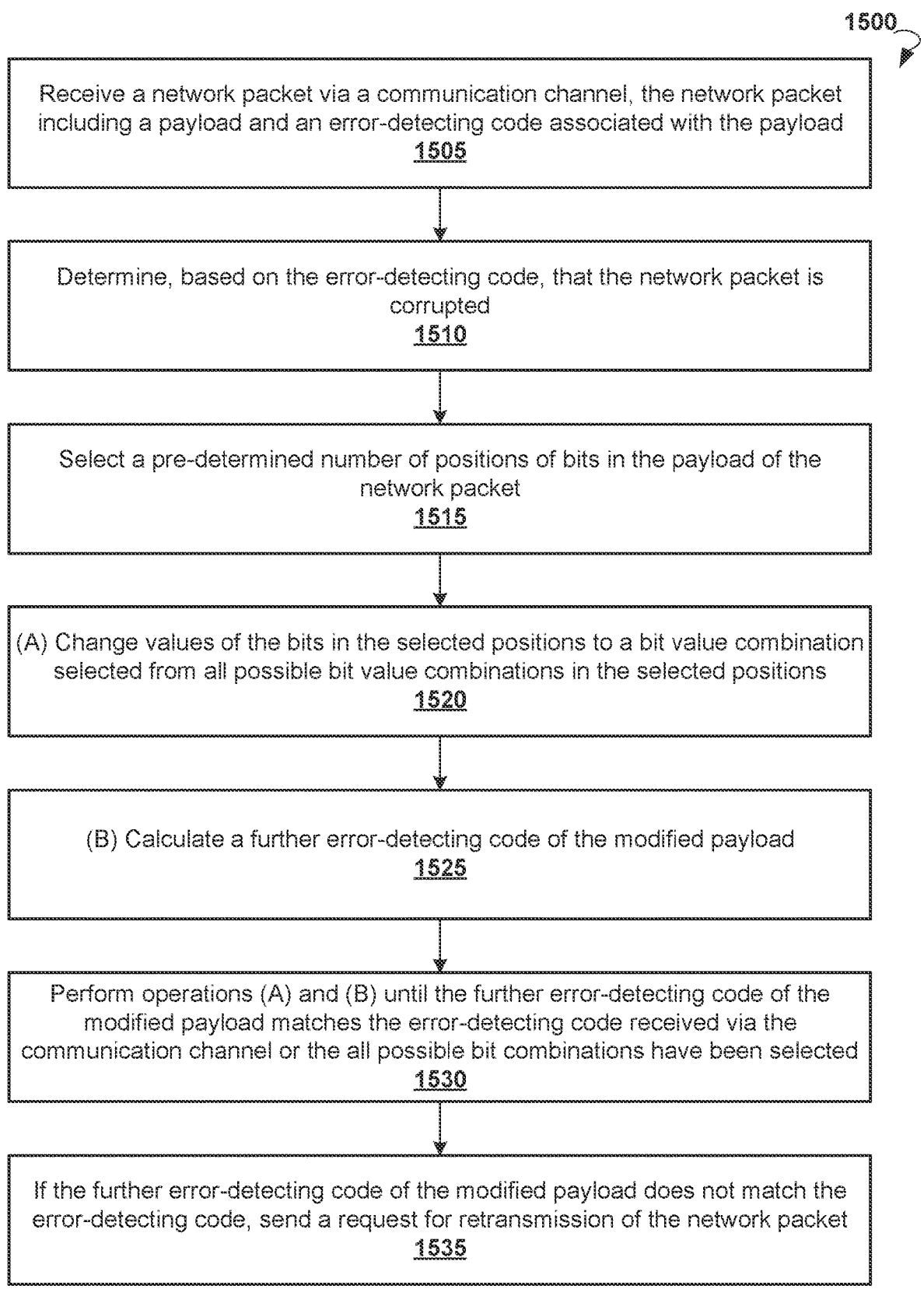
FIG. 15 is a flow chart showing a method for error correction in network packets, according to various example embodiments of the present disclosure.

FIG. 15 is a flow chart of a method 1500 for error correction in network packets, according to various example embodiments. The method 1500 can be performed by receiver 120 in environment 100 shown in FIG. 1.

The method 1500 may commence in block 1505 with receiving a network packet via a communication channel. The network packet may include a payload and an error-detecting code associated with the payload. The error-detecting code includes a cyclic redundancy check. The network packet can be encoded by an error correction code of the communication channel. The communication channel can be a wireless communication channel.

In block 1510, the method 1500 may include determining, based on the error-detecting code, that the network packet is corrupted.

In block 1515 the method 1500 may include selecting a pre-determined number of positions of bits in the payload of the network packet. The pre-determined number of the positions of bits in the payload can be less than the length of the payload. The selection of the pre-determined number of positions of bits in the payload of the network packet may include the following: 1) accumulating a sequence of copies of the network packet received in response to the request for retransmission, 2) determining, based on the copies of the network packets, values of bits at positions in the payload and confidence levels of the values, and 3) selecting the pre-determined number of positions having the lowest confidence levels.

The determination of the value at a position in the payload may include averaging values of bits at the position in the copies of network packets. Determining a confidence level of the value at the position includes determining a distance between the value and one of 1 or 0.

In other embodiments, a value at a position in the payload and a confidence level of the value at the position can be determined by a ML model and based on a matrix of values of bits in the copies of network packet. The matrix can be formed by values of bits at pre-defined number of neighbor positions in the copies. The ML model may include a neural network, e.g., a convolutional neural network, artificial neural network, Bayesian neural network, supervised machine learning neural network, semi-supervised machine learning neural network, unsupervised machine learning neural network, reinforcement learning neural network, and so forth. The ML model can be trained based on a training set of network packets transferred via the communication channel.

In block 1520, the method 1500 may include changing values of the bits in the selected positions to a bit value combination selected from all possible bit value combinations in the selected positions to modify the payload. In block 1525, the method 1500 calculating a further error-detecting code of the modified payload. In block 1530, the method may continue performing operations of blocks 1520 and 1525 until the further error-detecting code of the modified payload matches the error-detecting code received via the communication channel or all possible bit combinations have been selected.

In block 1535, if the further error-detecting code of the modified payload does not match the error-detecting code, the method 1500 may include requesting for retransmission of the network packet.

Figure 16:
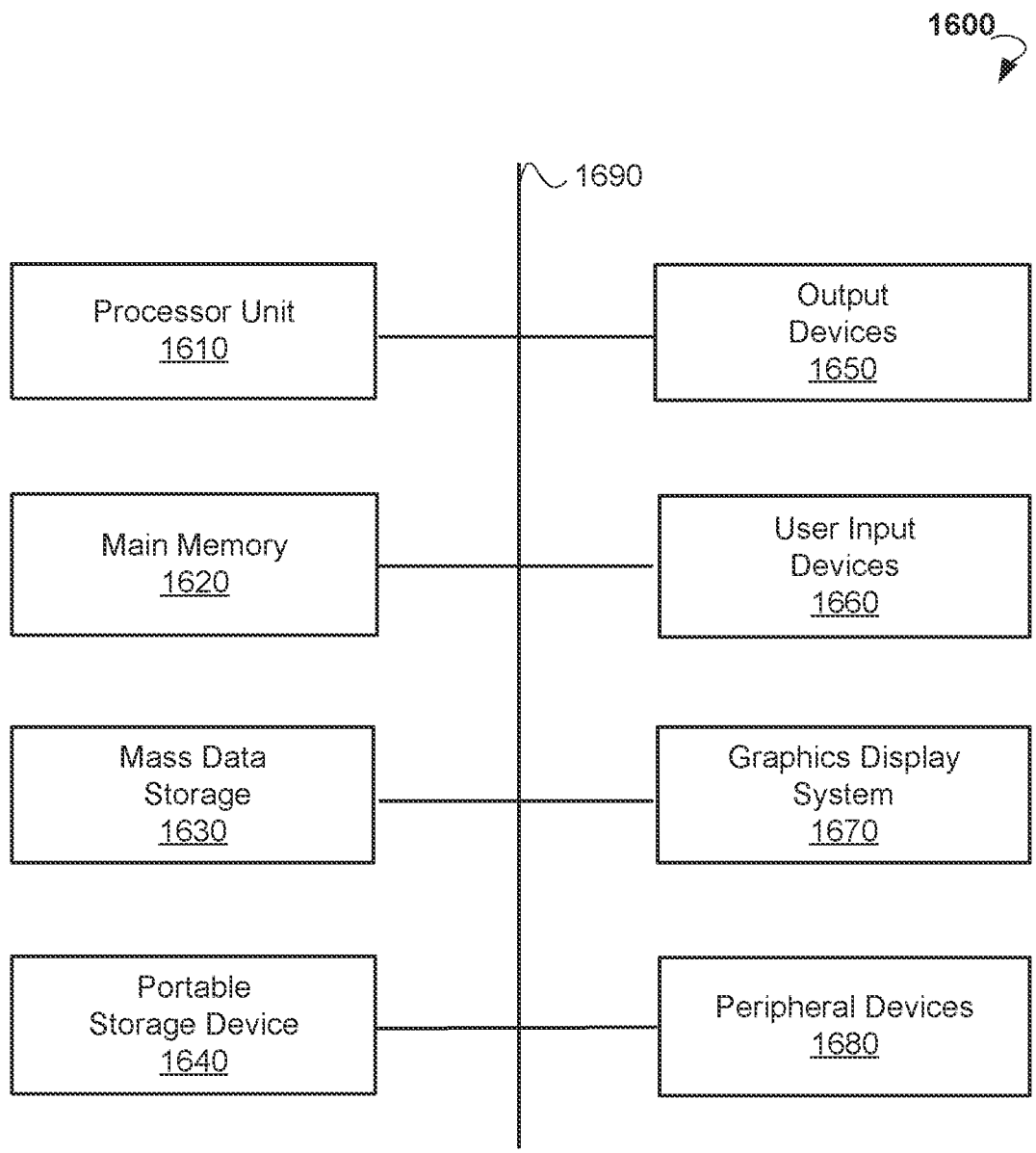
FIG. 16 shows a computing system that can be used to implement a system and a method for error correction in network packets, according to an example embodiment.

FIG. 16 illustrates an exemplary computer system 1600 that may be used to implement some embodiments of the present invention. The computer system 1600 of FIG. 16 may be implemented in the contexts of the likes of computing systems, networks, servers, transmitters, receivers, or combinations thereof. The computer system 1600 of FIG. 16 includes one or more processor units 1610 and main memory 1620. Main memory 1620 stores, in part, instructions and data for execution by processor units 1610. Main memory 1620 stores the executable code when in operation, in this example. The computer system 1600 of FIG. 16 further includes a mass data storage 1630, portable storage device 1640, output devices 1650, user input devices 1660, a graphics display system 1670, and peripheral devices 1680.

The components shown in FIG. 16 are depicted as being connected via a single bus 1690. The components may be connected through one or more data transport means. Processor unit 1610 and main memory 1620 is connected via a local microprocessor bus, and the mass data storage 1630, peripheral device(s) 1680, portable storage device 1640, and graphics display system 1670 are connected via one or more input/output (I/O) buses.

Mass data storage 1630, which can be implemented with a magnetic disk drive, solid state drive, or an optical disk drive, is a non-volatile storage device for storing data and instructions for use by processor unit 1610. Mass data storage 1630 stores the system software for implementing embodiments of the present disclosure for purposes of loading that software into main memory 1620.

Portable storage device 1640 operates in conjunction with a portable non-volatile storage medium, such as a flash drive, floppy disk, compact disk, digital video disc, or USB storage device, to input and output data and code to and from the computer system 1600 of FIG. 16. The system software for implementing embodiments of the present disclosure is stored on such a portable medium and input to the computer system 1600 via the portable storage device 1640.

User input devices 1660 can provide a portion of a user interface. User input devices 1660 may include one or more microphones, an alphanumeric keypad, such as a keyboard, for inputting alphanumeric and other information, or a pointing device, such as a mouse, a trackball, stylus, or cursor direction keys. User input devices 1660 can also include a touchscreen. Additionally, the computer system 1600 as shown in FIG. 16 includes output devices 1650. Suitable output devices 1650 include speakers, printers, network interfaces, and monitors.

Graphics display system 1670 include a liquid crystal display (LCD) or other suitable display device. Graphics display system 1670 is configurable to receive textual and graphical information and processes the information for output to the display device.

Peripheral devices 1680 may include any type of computer support device to add additional functionality to the computer system.

The components provided in the computer system 1600 of FIG. 16 are those typically found in computer systems that may be suitable for use with embodiments of the present disclosure and are intended to represent a broad category of such computer components that are well known in the art. Thus, the computer system 1600 of FIG. 16 can be a personal computer (PC), handheld computer system, telephone, mobile computer system, workstation, tablet, phablet, mobile phone, server, minicomputer, mainframe computer, wearable, an Internet of things device/system, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, and other suitable operating systems.

The processing for various embodiments may be implemented in software that is cloud-based. In some embodiments, the computer system 1600 is implemented as a cloud-based computing environment, such as a virtual machine operating within a computing cloud. In other embodiments, the computer system 1600 may itself include a cloud-based computing environment, where the functionalities of the computer system 1600 are executed in a distributed fashion. Thus, the computer system 1600, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 1600, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

The present technology is described above with reference to example embodiments. Therefore, other variations upon the example embodiments are intended to be covered by the present disclosure.

What is claimed is:

1. A method comprising:
   receiving a network packet by a receiver via a communication channel, the network packet including a content and an error-detecting code associated with the content;
   determining, based on the error-detecting code, that the network packet is corrupted;
   selecting a pre-determined number of positions of bits in the content of the network packet, the selected positions being most uncertain positions of the bits among all positions of the bits in the content, wherein a level of uncertainty associated with a position selected from the selected positions is a difference between a value of a bit and an expected value for the bit at the position, wherein the expected value is determined using a machine learning model based on neighbor positions of the position, the neighbor positions being located immediately adjacent to the position;
   (A) Changing values of the bits in the selected positions to a bit value combination selected, from all possible bit value combinations in the selected positions modify the content;
   (B) calculating, a further error-detecting code of the modified content;
   performing operations (A) and (B) until the further error-detecting code of the modified content matches the error-detecting code received via the contamination channel or all possible bit combinations have been selected;
   when the further error-detecting code of the modified content matches the error-detecting code, determining that errors in the network packet have been corrected; and
   when the further error-detecting code of the modified content does not match the error-detecting code, retransmitting, by request, the network packet, via the communication channel, to the receiver.

2. The method of claim 1, wherein the pre-determined number of positions of bits in the content is less than a length of the content.

3. The method of claim 1, wherein the selecting the pre-determined number of positions of bits in the content of the network packet includes:
   accumulating a sequence of copies of the network packet received in response to the request for retransmission;
   determining, based on the copies of the network packet, values of bits at the positions in the content and confidence levels of the values; and
   selecting the pre-determined number of positions having lowest confidence levels.

4. The method of claim 3, wherein the determining values of bits at the positions in the content includes averaging the values of bits at the positions in the copies of the network packet.

5. The method of claim 3, wherein determining a confidence level of a value at a position includes determining a distance between the value and 1 or 0.

6. The method of claim 3, wherein a value at the position in the content and a confidence level of the value at the position are determined by the machine learning model and based on a matrix of values of bits in the copies of the network packet, the matrix being formed by values of bits at a pre-defined number of the neighbor positions in the copies, the neighbor positions including the position.

7. The method of claim 6, wherein the machine learning model includes at least one of the following: a convolutional neural network, an artificial neural network, a Bayesian neural network, a supervised machine learning neural network, a semi-supervised machine learning neural network, an unsupervised machine learning neural network, and a reinforcement learning neural network.

8. The method of claim 6, wherein the machine learning model is trained based on a training set of network packets transferred via the communication channel.

9. The method of claim 1, wherein the error-detecting code includes a cyclic redundancy check.

10. The method of claim 1, wherein the network packet is encoded by an error correction code of the communication channel.

11. The method of claim 1, wherein the communication channel is a wireless communication channel.

12. A system comprising:
   at least one processor; and
   a memory communicatively coupled to the processor, the memory storing instructions executable by the at least one processor to perform a method comprising:
      receiving a network packet by a receiver via a communication channel, the network packet including a content and an error-detecting, code associated with the content;
      determining, based or the error-detecting code, that the network packet is corrupted;
      selecting a pre-determined number of positions of bits in the content of the network packet, the selected positions being most uncertain positions of the bits among all positions of the bits in the content, wherein a level of uncertainty associated with a position selected from the selected positions is a difference between a value of a bit and an expected value for the bit at the position, wherein the expected value is determined using a machine learning model based on neighbor positions of the position, the neighbor positions being located immediately adjacent to the position;

(A) changing values of the bits in the selected positions to a bit value combination selected from all possible bit value combinations in the selected positions to modify the content;

(B) calculating a further error-detecting code of the modified content;

performing operations (A) and (B) until the further error-detecting code of the modified content matches the error-detecting code received via the communication channel or all possible bit combinations have been selected;

when the further error-detecting code of the modified content matches the error-detecting code, determining that errors in the network packet have been corrected; and when the thither error-detecting code of the modified content does not match the error-detecting code, retransmitting, by request, the network packet, via the communication channel, to the receiver.

13. The system of claim 12, wherein the pre-determined number of positions of bits in the content is less than a length of the content.

14. The system of claim 12, wherein the selecting the pre-determined number of positions of bits in the content of the network packet includes:
   accumulating a sequence of copies of the network packet received in response to the request for retransmission;
   determining, based on the copies of the network packet, values of bits at the positions in the content and confidence levels of the values; and
   selecting the pre-determined number of positions having lowest confidence levels.

15. The system of claim 14, wherein the determining values of bits at the positions in the content includes averaging the values of bits at the positions in the copies of the network packet.

16. The system of claim 14, wherein determining a confidence level of the value at the position includes determining a distance between the value and 1 or 0.

17. The system of claim 14, wherein a value at the position in the content and a confidence level of the value at the position are determined by the machine learning model and based on a matrix of values of bits in the copies of the network packet, the matrix being formed by values of bits at a pre-defined number of the neighbor positions in the copies, the neighbor positions including the position.

18. The system of claim 17, wherein the machine learning model includes at least one of the following: a convolutional neural network, an artificial neural network, a Bayesian neural network, a supervised machine learning neural network, a semi-supervised machine learning neural network, an unsupervised machine learning neural network, and a reinforcement learning neural network.

19. The system of claim 17, wherein the machine learning model is trained based on a training set of network packets transferred via the communication channel.

20. A non-transitory processor-readable medium having embodied thereon a program being executable by at least one processor to perform a method comprising:
   receiving a network packet by a receiver is a communication channel, the network packet including a content and a error detecting code associated with the content;
   determining, based on the error-detecting code, that the network packet is corrupted;
   selecting a pre-determined number of positions of bits in the content of the network packet, the selected positions being most uncertain positions of the bits among ill positions of the bits in the content, wherein a level of uncertainty associated with a position selected from the selected positions is a difference between a value of a bit and an expected value for the bit at the position, wherein the expected value is determined using a machine learning model based on neighbor positions of the position, the neighbor positions being located immediately adjacent to the position;

(A) changing values of the bits in the selected positions to a bit value combination selected from all possible bit value combinations in the selected positions to modify the content;

(B) calculating a further error-detecting code of the modified content;

performing operations (A) and (B) until the further error-detecting code of the modified content matches the error-detecting code received via the communication channel or all possible bit combinations have been selected;

when the further error-detecting code of the modified content matches the error-detecting code, determining that errors in the payload have been corrected; and when the further error-detecting code of the modified content does not match the error-detecting code, retransmitting, by request, the network packet, via the communication channel, to the receiver.

21. A method comprising:
receiving a network packet by a receiver via a communication channel, the network packet including a content and an error-detecting code associated with the content;

determining, based on the error-detecting code, that the network packet is corrupted;

selecting a pre-determined number of positions of bits in the content of the network packet, the selected positions being most uncertain positions of the bits among all positions of the bits in the content, wherein a level of uncertainty associated with a position selected from the selected positions is a difference between a value of a bit and an expected value for the bit at the position, wherein the expected value is determined using a machine learning model based on neighbor positions of the position, the neighbor positions being located adjacent to the position based on a pre-defined number of neighbor positions;

(A) changing values of the bits in the selected positions to a bit value combination selected from all possible bit value combinations in the selected positions to modify the content;

(B) calculating a further error-detect ng code of the modified content;

performing operations (A) and (B) until the further error-detecting code of the modified content matches the error-detecting code received via the communication channel or all possible bit combinations have been selected;

when the further error-detecting code of the modified content matches the error-detecting code, determining that errors in the network packet have been corrected; and when the further error-detecting code of the modified content does not match the error-detecting code, retransmitting, by request, the network packet, via the communication channel, to the receiver.

* * * * *